United States Patent
Baldwin

(10) Patent No.: US 11,189,975 B1
(45) Date of Patent: Nov. 30, 2021

(54) POWERED WALL PLATE

(71) Applicant: Jeffrey P. Baldwin, Anthem, AZ (US)

(72) Inventor: Jeffrey P. Baldwin, Anthem, AZ (US)

( * ) Notice: Subject to any disclaimer, the term of this patent is extended or adjusted under 35 U.S.C. 154(b) by 26 days.

(21) Appl. No.: 16/774,878

(22) Filed: Jan. 28, 2020

Related U.S. Application Data

(60) Continuation-in-part of application No. 16/599,126, filed on Oct. 11, 2019, now Pat. No. 10,741,982, which is a division of application No. 15/972,001, filed on May 4, 2018, now Pat. No. 10,574,005.

(60) Provisional application No. 62/502,763, filed on May 7, 2017.

(51) Int. Cl.
| | |
|---|---|
| H01R 25/00 | (2006.01) |
| H01R 13/74 | (2006.01) |
| H01R 13/717 | (2006.01) |
| H01R 27/02 | (2006.01) |

(52) U.S. Cl.
CPC ......... *H01R 13/748* (2013.01); *H01R 13/717* (2013.01); *H01R 27/02* (2013.01)

(58) Field of Classification Search
CPC .... H01R 25/006; H01R 23/025; H01R 31/06; H01R 31/02; H02G 3/20; H02G 3/18; H02G 3/14; Y02E 60/12; H02J 7/025
USPC ............. 439/535–537, 650–652; 174/53, 55, 174/66–67; 220/241–242; 320/107–108
See application file for complete search history.

(56) References Cited

U.S. PATENT DOCUMENTS

| | | | |
|---|---|---|---|
| 3,522,595 A | 8/1970 | White | |
| 4,514,789 A | 4/1985 | Jester | |
| 4,536,694 A | 8/1985 | McCarty | |
| 4,835,343 A | 5/1989 | Graef | |
| 5,539,821 A * | 7/1996 | Blonder | H02J 7/0044 |
| | | | 379/446 |
| 6,423,900 B1 | 7/2002 | Soules | |
| 6,977,341 B1 | 12/2005 | Gustaveson | |
| 6,981,896 B2 | 1/2006 | Su | |
| 6,993,289 B2 * | 1/2006 | Janik | H04B 3/54 |
| | | | 455/41.2 |

(Continued)

OTHER PUBLICATIONS https://www.legrand.us/radiant/products/outlets/rwc826usbwccv2.aspx.
https://www.hubbell.com/wiringdevice-kellems/en/Products/Electrical-Electronic/Wiring-Devices/Charging-Solutions/Power-Charging-Stations/USB2028AC/p/3936295#prod-resources-section.

*Primary Examiner* — Thanh Tam T Le
(74) *Attorney, Agent, or Firm* — Booth Udall Fuller, PLC

(57) ABSTRACT

A powered wall plate with at least two electrical plug prongs configured to removably mate with an electrical receptacle of an electrical device. A protruding front face extends from the front surface and has a plurality of electrical current apertures extending into the front face, which are configured to receive an electrical plug. A plurality of mounting screw apertures extend through the wall plate, configured to receive a plurality of mounting screws to attach the wall plate to the electrical device. One of the mounting screw apertures may be located on the front face. A spacer may be placed between the wall plate and the electrical device to close a gap. A plurality of LED lights is located along a bottom edge of the front surface, a photocell is exposed on the front surface of the wall plate, and a control switch has an on position, an off position, and an auto position. A circuit between the front face and a rear surface of the wall plate is operatively coupled to a USB port on a side surface of the front face. The USB port is configured to provide power when power is supplied to the at least two electrical plug prongs.

19 Claims, 46 Drawing Sheets

(56) References Cited

U.S. PATENT DOCUMENTS

| | | | |
|---|---|---|---|
| 7,247,793 B2 | 7/2007 | Hinkson | |
| 7,271,339 B2 | 9/2007 | Dinh | |
| 7,654,855 B2 * | 2/2010 | Liao | H01R 13/60 |
| | | | 439/441 |
| 7,833,037 B2 | 11/2010 | Reusche | |
| 7,896,702 B2 | 3/2011 | Stiehl | |
| 8,378,625 B2 * | 2/2013 | Gourley | H02J 7/02 |
| | | | 320/107 |
| 8,456,131 B2 * | 6/2013 | Bukow | H02J 7/0044 |
| | | | 320/111 |
| 8,668,347 B2 | 3/2014 | Ebeling | |
| 8,864,517 B2 | 10/2014 | Cohen | |
| 8,912,442 B2 | 12/2014 | Smith | |
| 9,065,263 B2 * | 6/2015 | Porcano | H02G 3/14 |
| 9,124,105 B2 * | 9/2015 | Gunderman | H02J 50/90 |
| 9,362,728 B2 | 6/2016 | Smith | |
| 9,551,454 B2 * | 1/2017 | Lipke | H02J 7/0044 |
| D781,241 S | 3/2017 | Knight | |
| 9,825,414 B2 | 11/2017 | Armslrong | |
| 10,161,806 B2 | 12/2018 | Lermann | |
| 10,340,722 B2 * | 7/2019 | Rohmer | H02J 7/0044 |
| 2008/0272258 A1 * | 11/2008 | Wysoczynski | F16M 13/02 |
| | | | 248/309.1 |
| 2018/0193545 A1 | 7/2018 | Crnkovich | |

* cited by examiner

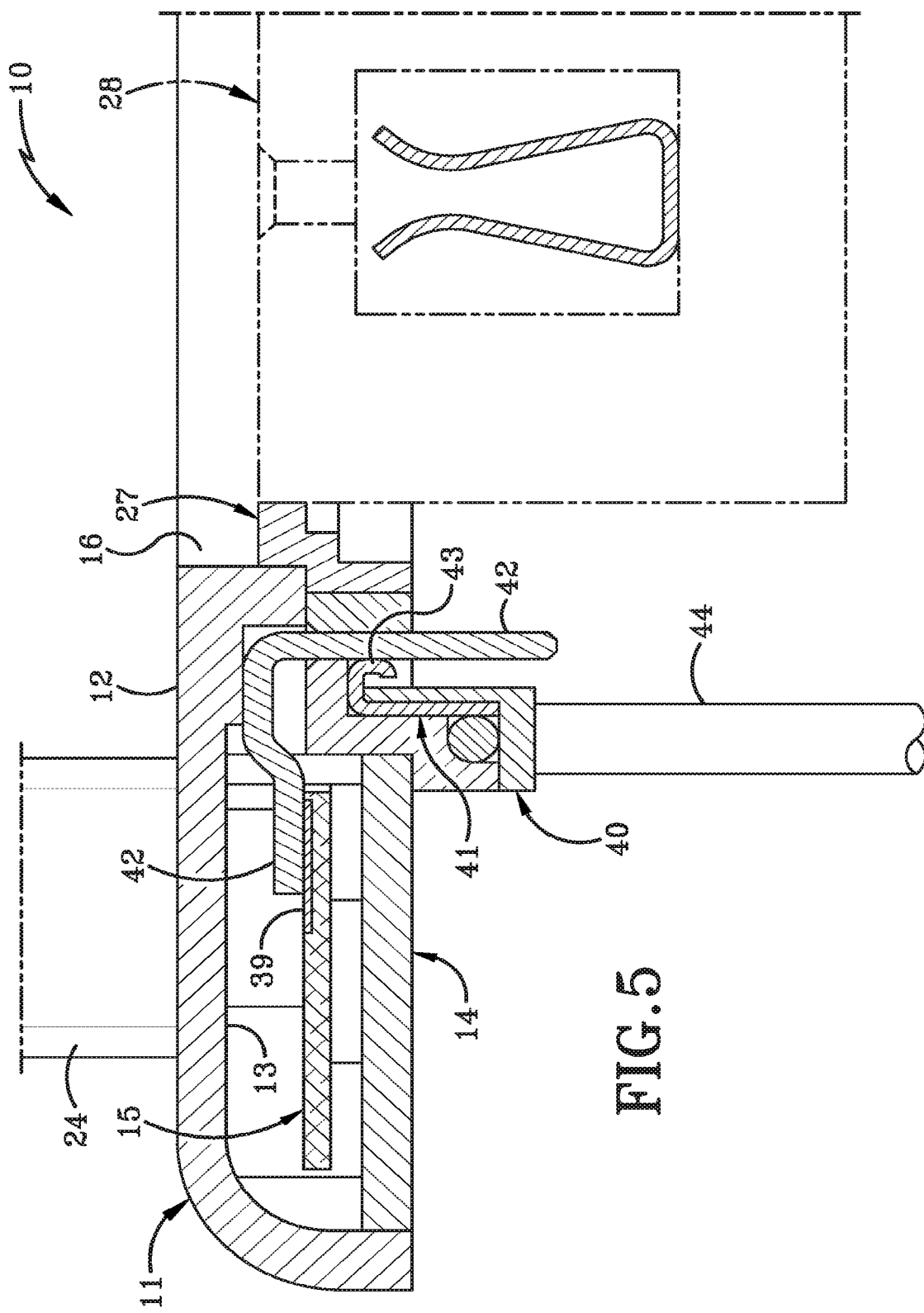

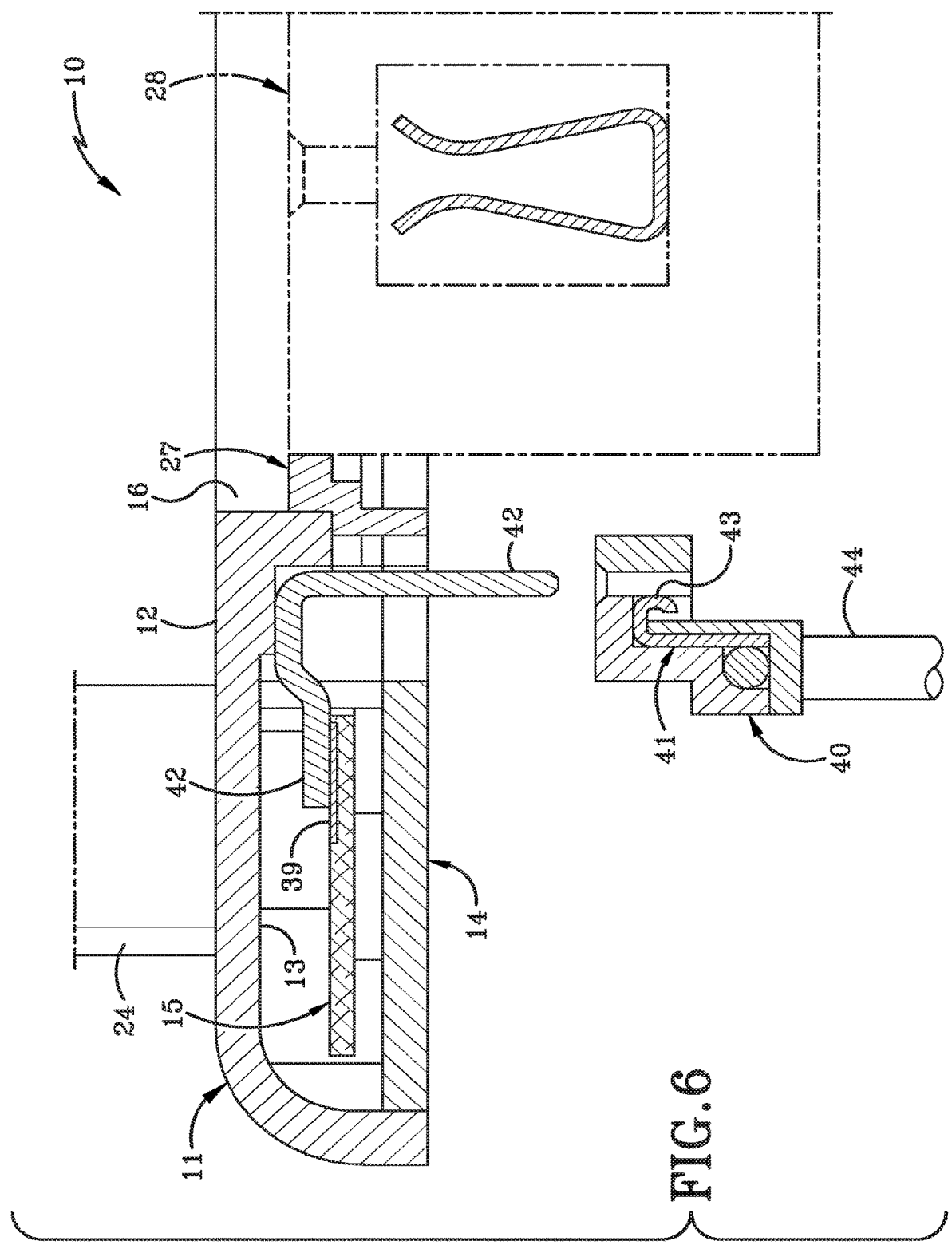

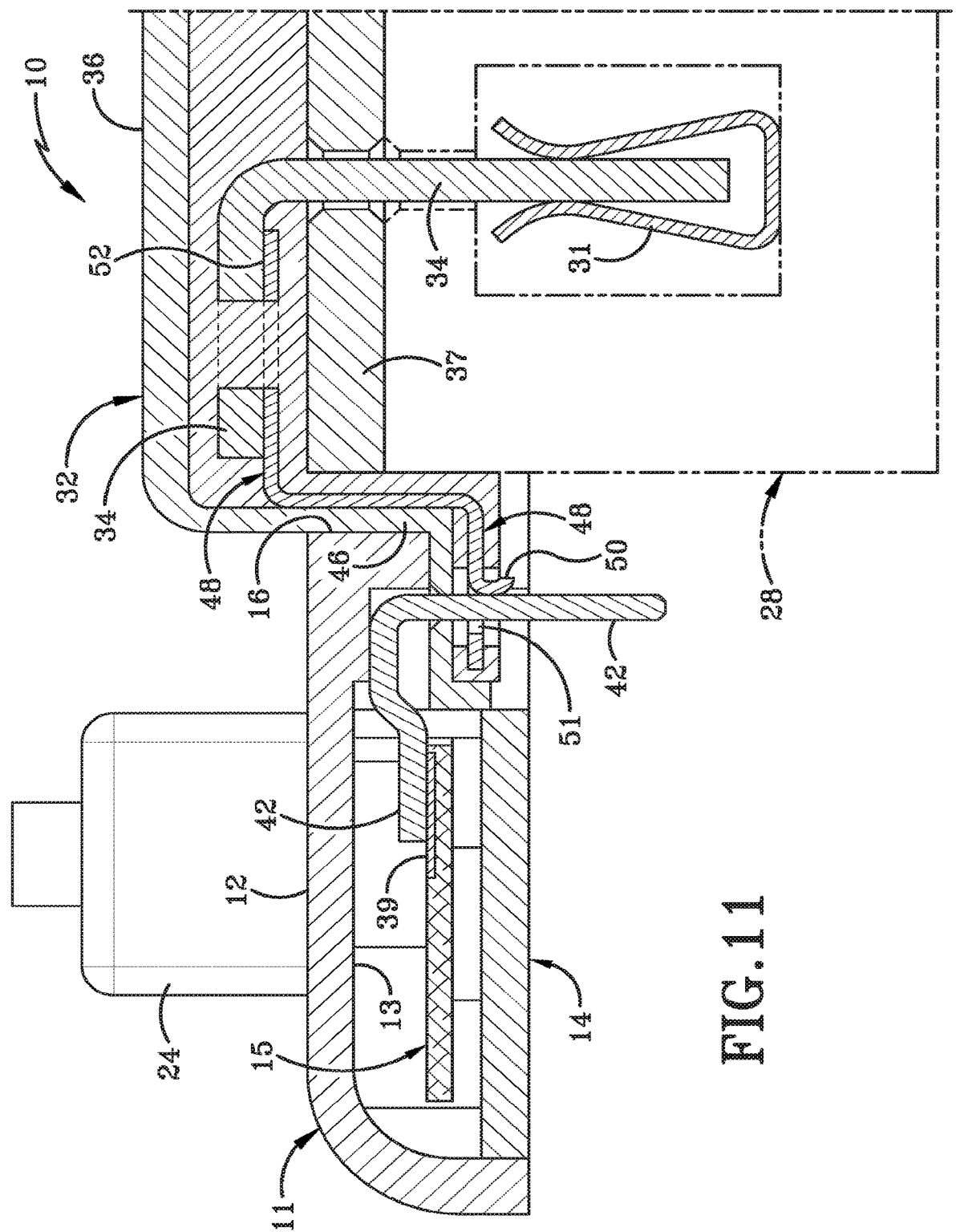

POWERED WALL PLATE

RELATED APPLICATIONS

This application is a continuation-in-part application of U.S. Utility patent application Ser. No. 16/599,126 entitled "Powered Wall Plate" to Jeffrey P. Baldwin, filed on Oct. 11, 2019, which application is a divisional application of U.S. Utility patent application Ser. No. 15/972,001 entitled "Powered Wall Plate" to Jeffrey P. Baldwin, filed on May 4, 2018, which application claims the benefit of the filing date of U.S. Provisional Patent Application 62/502,763 entitled "Powered Wall Plate" to Jeffrey P. Baldwin that was filed on May 7, 2017, the contents of which are hereby incorporated by this reference.

BACKGROUND

1. Technical Field

Aspects of the present disclosure relate generally to wall plates and wall plates which are electrically active and receive and/or convey electrical current.

2. Background Art

Wall plates are well known and are used to fill in the space between an electrical box and an electrical device. Specifically, the wall plates are known to provide a more aesthetically pleasing appearance while also preventing access to the electrical device. By preventing access to the electrical device, the user is safer because electrical wiring is not readily accessible.

Wall plates are also known to provide a simple lighting source or powering portable devices USB, but are commonly unsafe and rely on direct, spring biased connections with an installed electrical receptacle. These spring biased electrical connections are unsafe due to the inherent unreliability of the spring biased connections which may short or become damaged over time, leading to electrical and/or fire hazards.

SUMMARY

According to an aspect of the disclosure, a powered wall plate may comprise a wall plate having a front surface opposite a rear surface and at least one opening extending through the front surface and the rear surface that is sized to expose at least a first half of an electrical device therethrough, at least two electrical plug prongs originating within the wall plate and extending rearward from the rear surface, the at least two electrical plug prongs configured to removably mate with an electrical receptacle located on a second half of the electrical device, the rear surface surrounding the at least two electrical plug prongs including a recess, the recess sized to receive a face of the electrical device therein against the rear surface within the recess, a protruding front face extending from the front surface, a plurality of mounting screw apertures extending through the wall plate and configured to receive a plurality of mounting screws to attach the wall plate to the electrical device, wherein at least one of the plurality of mounting screw apertures extends through the protruding front face, a cell phone charging station extending to a side of the wall plate, the charging station comprising a cell phone charging plate parallel and aligned with the front surface of the wall plate and adjacent to the opening, the charging plate configured to charge a phone when the phone is in a position near the charging plate, and a phone support extending forward from the front surface below the charging plate, the phone support configured to hold the phone in the position near the charging plate, and at least one USB port exposed on a side surface of the protruding front face and electrically coupled to the electrical plug prongs through an electrical circuit located in between the front face and the rear surface, wherein the circuit is configured to provide power to the at least one USB port and the cell phone charging plate when power is supplied to the at least two electrical plug prongs.

Particular implementations may comprise one or more of the following features. The first half of the electrical device may be a top half of the electrical device. The second half of the electrical device may be a bottom half of the electrical device. The phone support may include at least two clips extending forward from the front surface and curving toward the charging plate.

According to an aspect of the disclosure, a powered wall plate may comprise a wall plate having a front surface opposite a rear surface and at least one opening extending through the front surface and the rear surface that is sized to expose a first half of an electrical device therethrough, at least two electrical plug prongs originating within the wall plate and extending rearward from the rear surface, the at least two electrical plug prongs configured to removably mate with an electrical receptacle located on a second half of the electrical device, a plurality of mounting screw apertures extending through the wall plate and configured to receive a plurality of mounting screws to attach the wall plate to the electrical device, and a cell phone charging station extending to a side of the wall plate, the charging station comprising a cell phone charging plate parallel and aligned with the front surface of the wall plate and adjacent to the opening, the charging plate configured to charge a phone when the phone is in a position near the charging plate, and a phone support extending forward from the front surface below the charging plate, the phone support configured to hold the phone in the position near the charging plate.

Particular embodiments may comprise one or more of the following features. The rear surface surrounding the at least two electrical plug prongs may include a recess, the recess sized to receive a face of the electrical device therein against the rear surface within the recess. A protruding front face extending from the front surface, wherein at least one of the plurality of mounting screw apertures extends through the protruding front face. At least one USB port exposed on a side surface of the protruding front face and electrically coupled to the electrical plug prongs through an electrical circuit located in between the front face and the rear surface. The circuit is configured to provide power to the at least one USB port and the cell phone charging plate when power is supplied to the at least two electrical plug prongs.

According to an aspect of the disclosure, a powered wall plate may comprise a wall plate having a front surface opposite a rear surface and at least one opening extending through the front surface and the rear surface that is sized to expose a portion of an electrical device therethrough, at least two electrical plug prongs originating within the wall plate and extending rearward from the rear surface, the at least two electrical plug prongs configured to removably mate with an electrical receptacle of the electrical device, and a cell phone charging station extending to a side of the wall plate, the charging station comprising a cell phone charging plate parallel and aligned with the front surface of the wall plate and adjacent to the opening, the charging plate configured to charge a phone when the phone is in a position near the charging plate, and a phone support positioned below the charging plate, the phone support configured to hold the phone in the position near the charging plate.

Particular embodiments may comprise one or more of the following features. The exposed portion of the electrical device may be a first half of the electrical device. The first half of the electrical device may be a top half of the electrical device. A protruding front face extending from the front surface. At least one USB port exposed on a side surface of the protruding front face and electrically coupled to the electrical plug prongs through an electrical circuit located in between the front face and the rear surface. The circuit may be configured to provide power to the at least one USB port and the cell phone charging plate when power is supplied to the at least two electrical plug prongs. A plurality of mounting screw apertures extending through the wall plate and configured to receive a plurality of mounting screws to attach the wall plate to the electrical device. At least one of the plurality of mounting screw apertures may extend through the protruding front face. The phone support may have at least two clips extending forward from the front surface and curving toward the charging plate. The rear surface surrounding the at least two electrical plug prongs may include a recess, the recess sized to receive a face of the electrical device therein against the rear surface within the recess.

Aspects of this disclosure also relate to a powered wall plate. In one aspect, a wall plate including a body having a front surface opposite a rear surface and at least one opening extending through the front surface and the rear surface, at least two electrical contacts on the rear surface, at least one wire removably connected to each of the at least two electrical contacts to supply electrical current from an electrical device positioned behind the wall plate.

In another aspect, a wall plate includes a body having a front surface opposite a rear surface and at least one opening extending through the front surface and the rear surface, an electrical contact on the rear surface, a plug-in module having an electrical prong extending rearward and a current transfer feature in electrical communication with the electrical prong, wherein the current transfer feature engages with the electrical contact on the rear surface to convey electrical current from the plug-in module to the electrical contact on the rear surface.

In an implementation, the wall plate may include a female electrical receptacle aperture on a surface opposite the electrical prong of the plug-in module. The plug-in module may include a plug-in module through hole aligned with a wall plate through hole. The installer may selectively utilize the plug-in module or a removable electrical wire to provide electrical current to the wall plate. The wall plate may further include at least one USB aperture, a light, or a photoelectric cell. The plug-in module current transfer feature may extend outward from a surface adjacent the electrical prong. The current transfer feature may be two current transfer features.

The plug-in module current transfer feature may further include an aperture or a protrusion. The plug-in module current transfer feature may further include a slideable member oriented to connect to electrical devices having different dimensions. The slideable member may move vertically to align with an aperture in an electrical receptacle installed in an electrical box. The plug-in module may further include a stop mechanism to limit travel of the slideable member in two directions. The wall plate may further include a plug-in module spacer positioned on the electrical prong to space the plug-in module from an electrical device. The plug-in module spacer may be spring biased to the extended position. The plug-in module may be molded integral with the wall plate. The plug-in module may be a separate component connected to the wall plate upon installation.

In another aspect, a wall plate includes a body having a front surface opposite a rear surface and at least one opening extending through the front surface and the rear surface and a body aperture for receiving a mounting screw, an electrical contact on the rear surface, a plug-in module having an electrical prong extending rearward and an aperture aligned with the body aperture for receiving the mounting screw, and wherein the mounting screw connects through the body aperture and the plug-in module aperture with an electrical device or an electrical box.

In an implementation, The plug-in module may further include a female electrical receptacle on a surface opposite the electrical prong. The female electrical receptacle aperture may be longitudinally aligned with the electrical prong. The plug-in module extends outward beyond the electrical wall plate.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 5 is a sectional view taken generally about line 5-5 in FIG. 4.

FIG. 6 is a sectional view taken generally about line 5-5 in FIG. 5 with the hardwire current transfer plug disconnected.

FIG. 11 is a sectional view taken generally about line 11-11 in FIG. 10.

DETAILED DESCRIPTION

Figure 1:
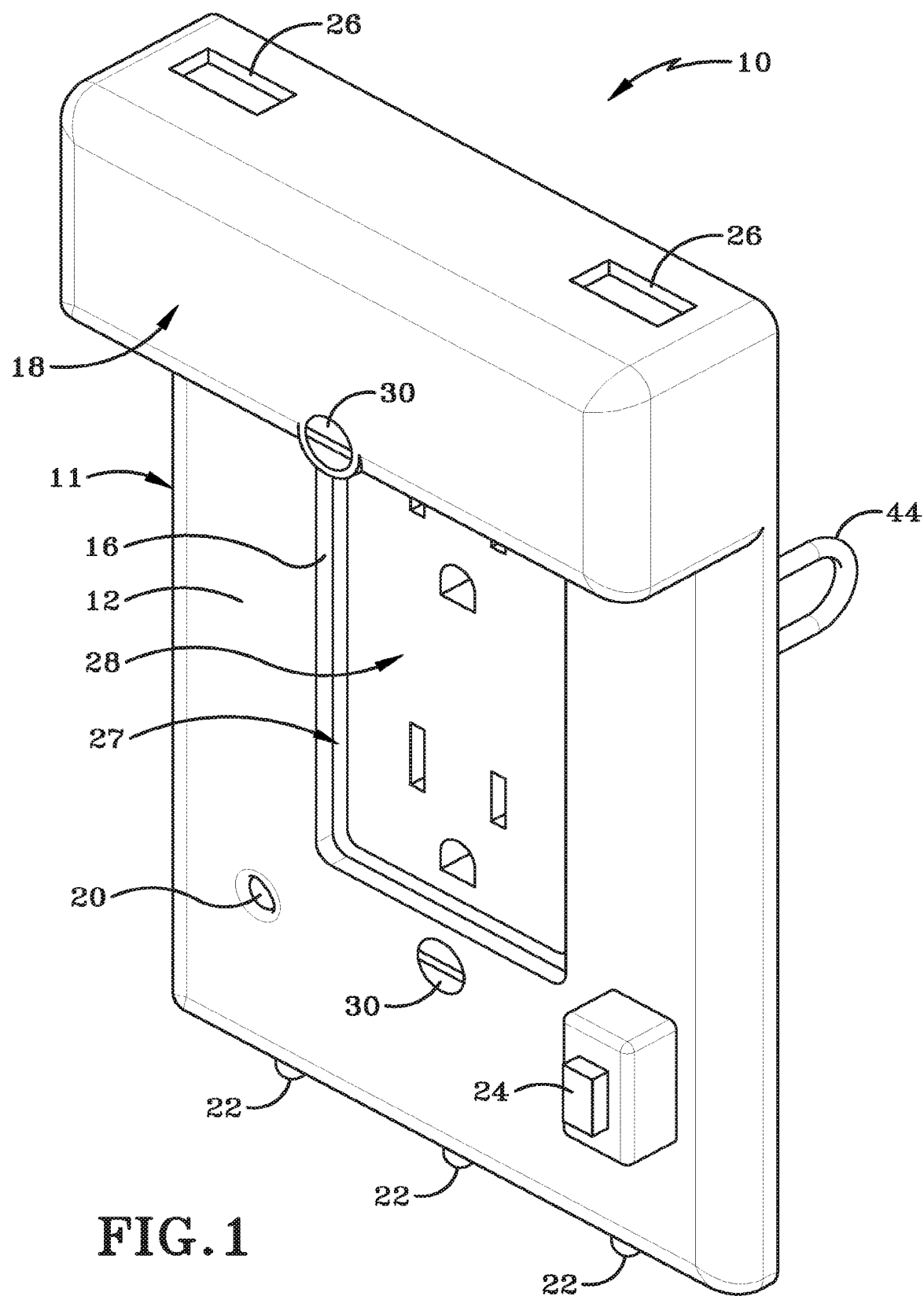
FIG. 1 is a perspective view of a first embodiment powered wall plate.
Figure 2:
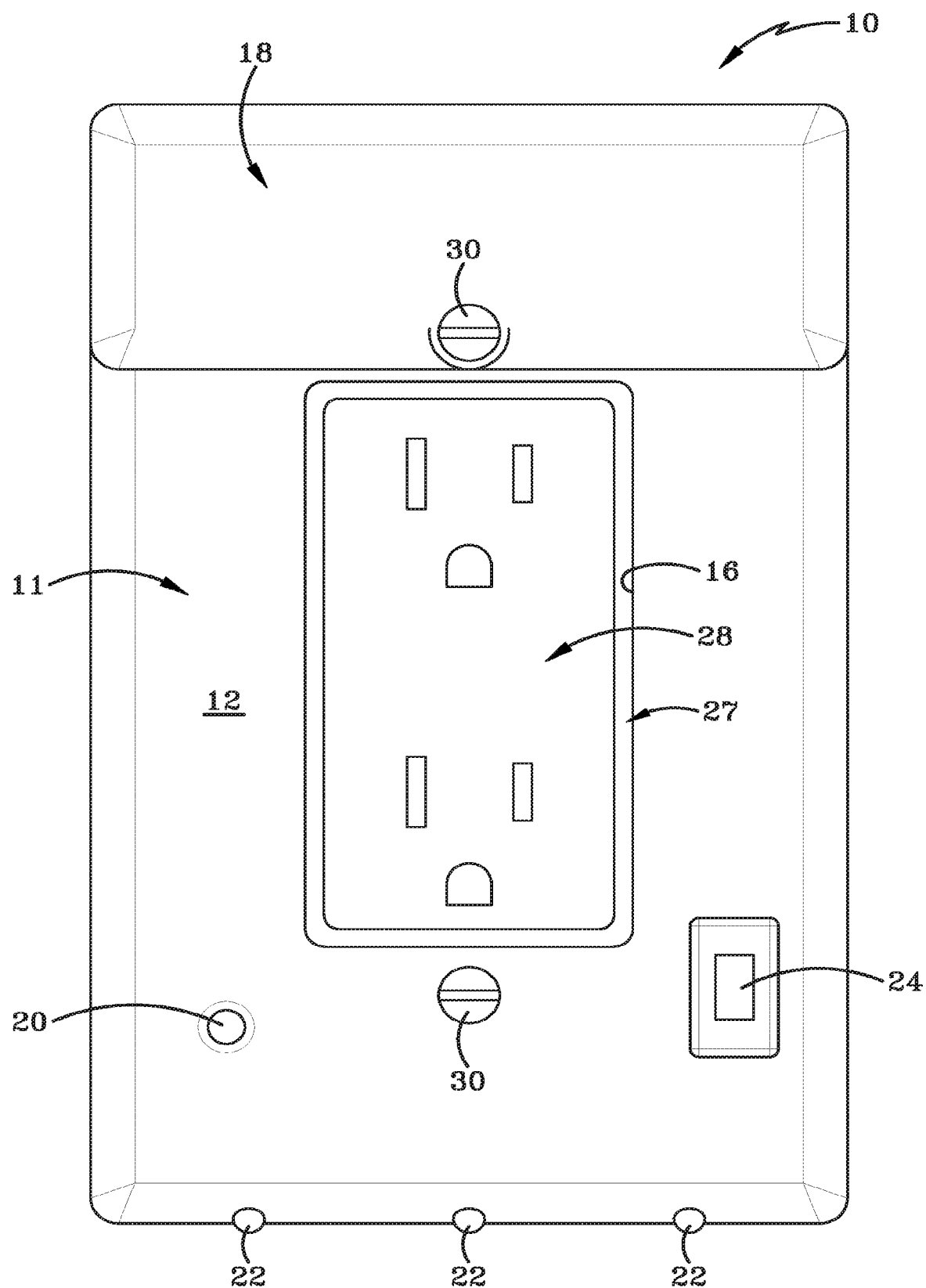
FIG. 2 is a front view of the powered wall plate.
Figure 3:
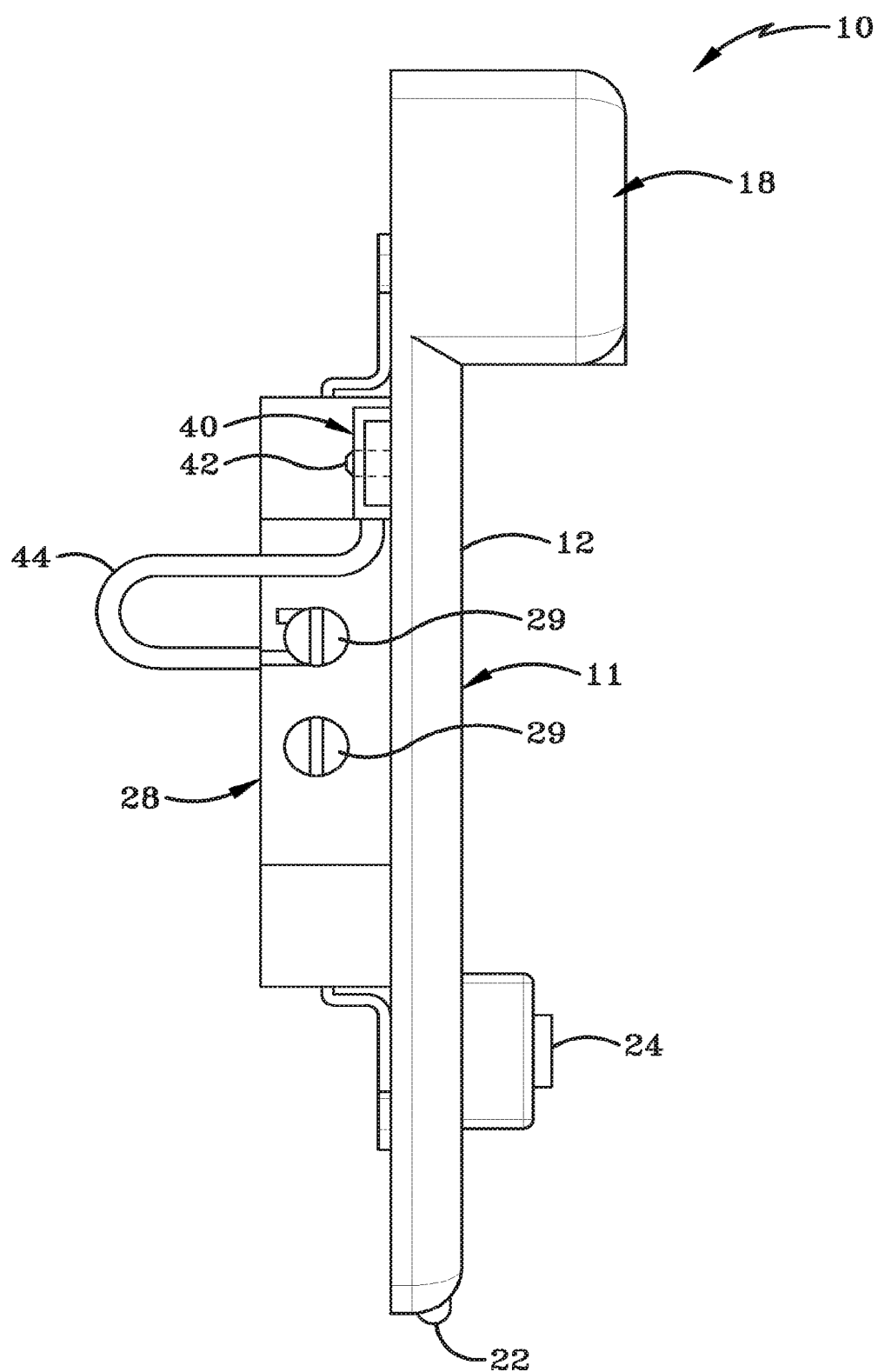
FIG. 3 is a left side view of the powered wall plate.
Figure 4:
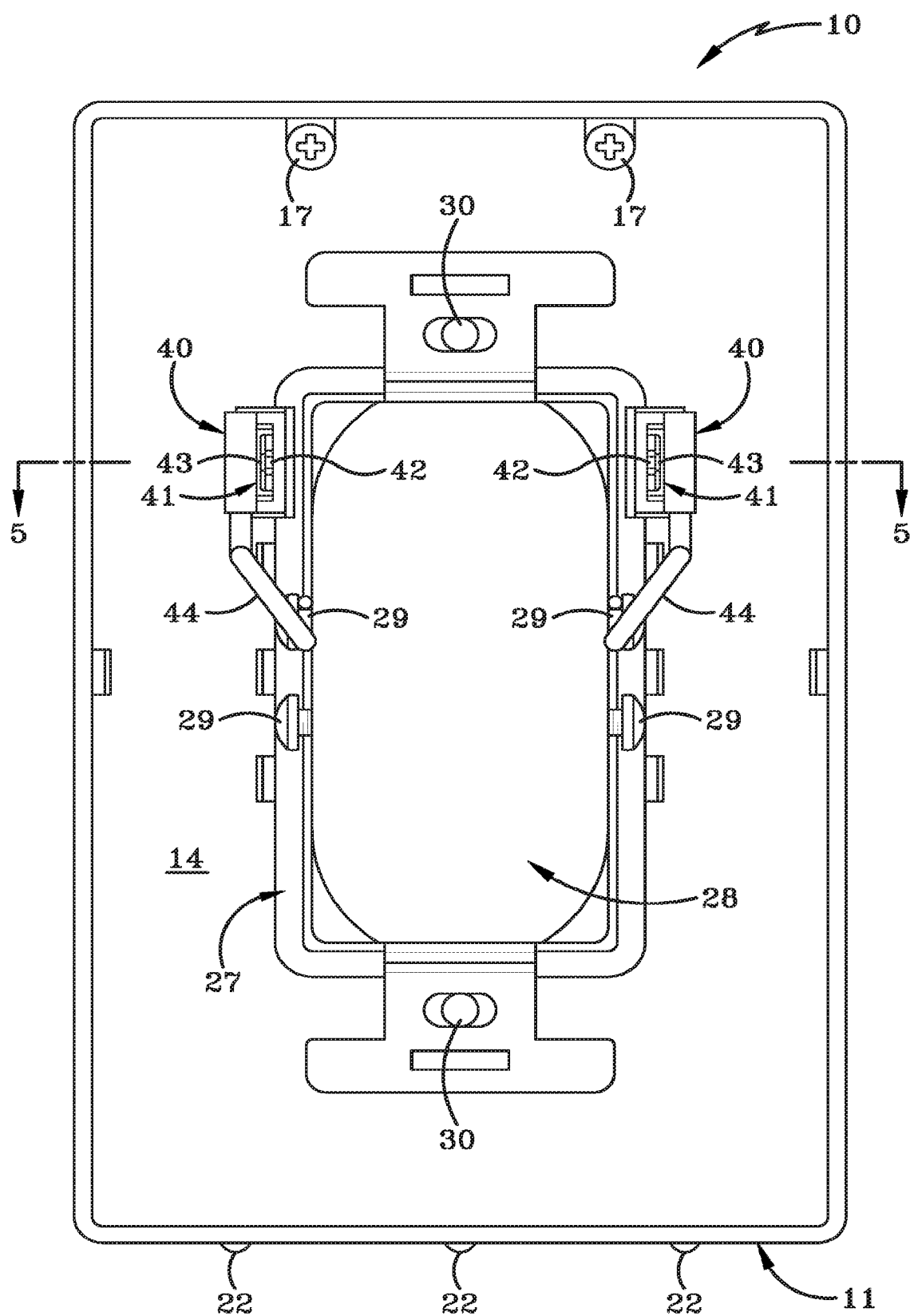
FIG. 4 is a rear view of the powered wall plate.

This disclosure, its aspects and implementations, are not limited to the specific components or assembly procedures disclosed herein. Many additional components and assembly procedures known in the art consistent with the intended operation and assembly procedures for a powered wall plate will become apparent for use with implementations of a powered wall plate from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a powered wall plate.

FIGS. 1 through 6 illustrate a first embodiment powered wall plate 10 having a body 11 with a front surface 12 and a rear surface 13. The powered wall plate may include a back plate 14 positioned behind rear surface 13 and secured in place with a plurality of screws 17. An opening 16 extends through the front surface 12 and the rear surface 13 to allow an electrical device 28 to be accessible. A transformer portion 18 maybe positioned on the top, bottom or sides of the powered wall plate and includes a circuit board 15 operatively arranged to control inputs and outputs for a photocell 20, LED or other suitable lights 22, a control switch (on/off/auto) 24, and power USB ports 26. Additional components or features may readily be included without departing from the spirit and scope of the present disclosure.

Powered wall plate 10 is secured to electrical device 28 or the electrical box with screws 30 and an adapter 27 which is complimentary shaped to the electrical device 28. For example, since electrical device 28 may be shaped or sized differently, an appropriate adapter will be utilized. Electrical device 28 includes current mounting screws 29 which are adapted to receive electrical wires 44. Electrical wires 44 connect at current mounting screws 29 and hard wire current transfer plug 40 which connects to wall plate current feature 42.

Moving to hard wire current transfer plug 40 in more detail, an electrode transfer portion 41 includes a current transfer contact 43 which is secured within the housing of current transfer plug 40 for each current path. Accordingly the current transfer plug can easily slide onto wall plate current feature 42 to securely and efficiently transfer electrical current from wire 44 and ultimately electrical device 28 to the wall plate through wall plate current feature 42 and into a wall plate interface 39 as seen in FIG. 6 with the current transfer plug 40 disconnected from wall plate current feature 42 and then connected in FIG. 5. Wall plate interface 39 then carries current to circuit board 15 to activate the LED lights, USB Power, control circuit, photocell, and any other features included on the powered wall plate.

Figure 5A:
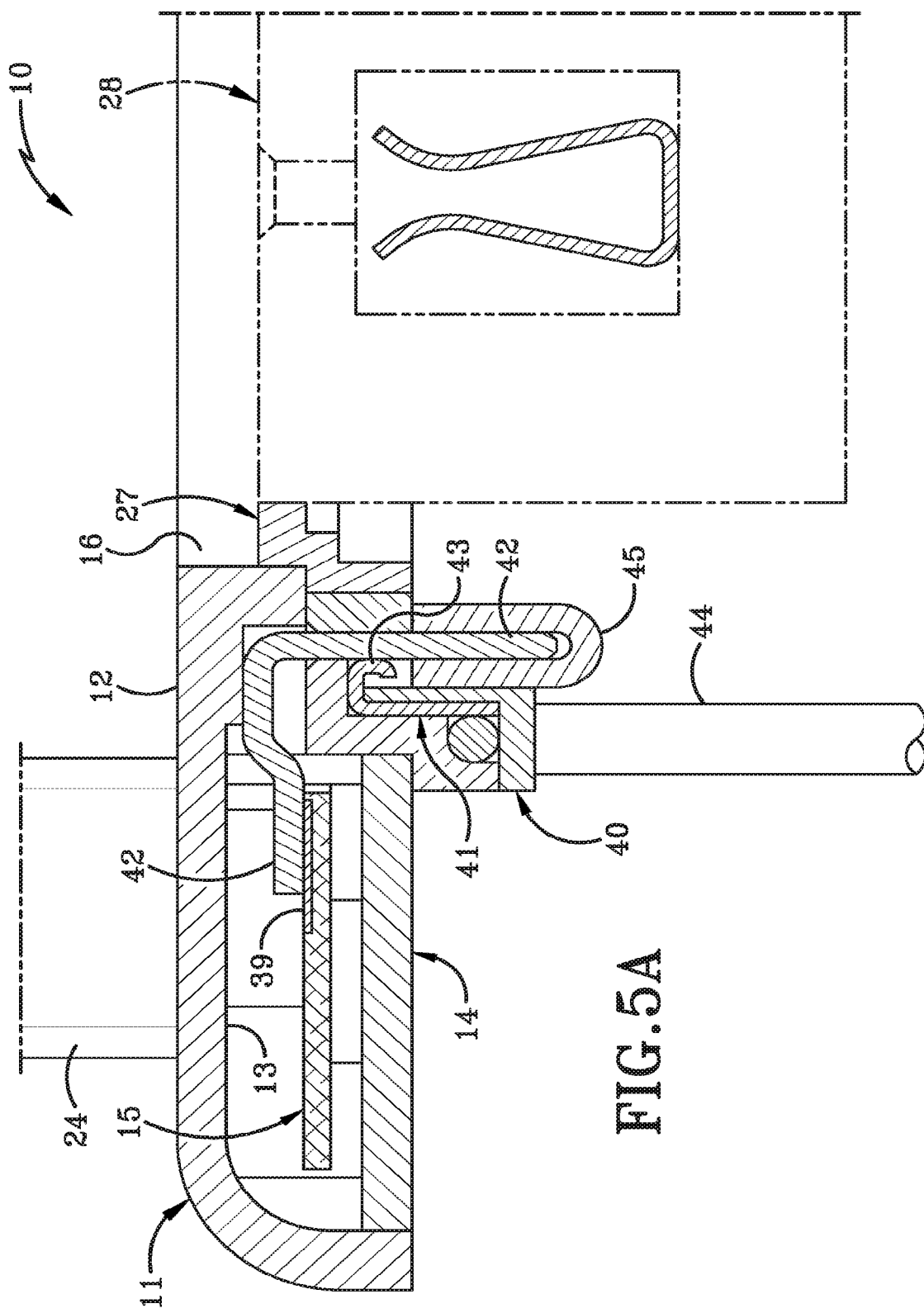
FIG. 5A is a sectional view taken generally about line 5-5 in FIG. 4 and including a cap.

FIG. 5 illustrates a similar current transfer plug 40 which includes an additional cap 45. Cap 45 is structured and oriented so that it can fit over wall plate current feature 42 after current transfer plug 40 is positioned securely on wall plate current feature 42. In this orientation, cap 45 functions to significantly reduce the risk of electrical shock or electrical shorts from wires contact an exposed conductor as well as reducing the likelihood that current transfer plug 40 may be inadvertently removed.

Installation of the hard wired powered wall plate 10 is simple in that the installer removes the original wall plate and unscrews the electrical device mounting screws. Next, electrical wire 44 is connected to the electrical device current mounting screws 29 and reinstalls electrical device 28 within an electrical box. The current transfer plug 40 on the other end of electrical wire 44 is then connected to each wall plate current feature 42 before the powered wall plat 10 is secured with screws 30. The installer may then reenergize the circuit and have USB power, lighting, and control of the electrical current provided to wall plate 10. In one implementation, the installer may include an adapter around the opening 16 of the wall plate depending on the electrical device 28 used and may install a cap 45 to prevent electrocution or electrical shorts.

Advantageously, the powered wall plate can include any number of circuits to provide any number of usable features within the spirit and scope of the present disclosure. While examples include USB ports, LED lighting, a photocell, a control circuit, or the like, any suitable input, output, or control circuit may be implemented in the powered wall plate. Still further, the hard wire option shown in FIGS. 1-6 provides the advantage of using electrical current from the electrical device 28 securely and safely with electrical wires while still allowing all the electrical device apertures to be free and used from other appliances or components.

Figure 7:
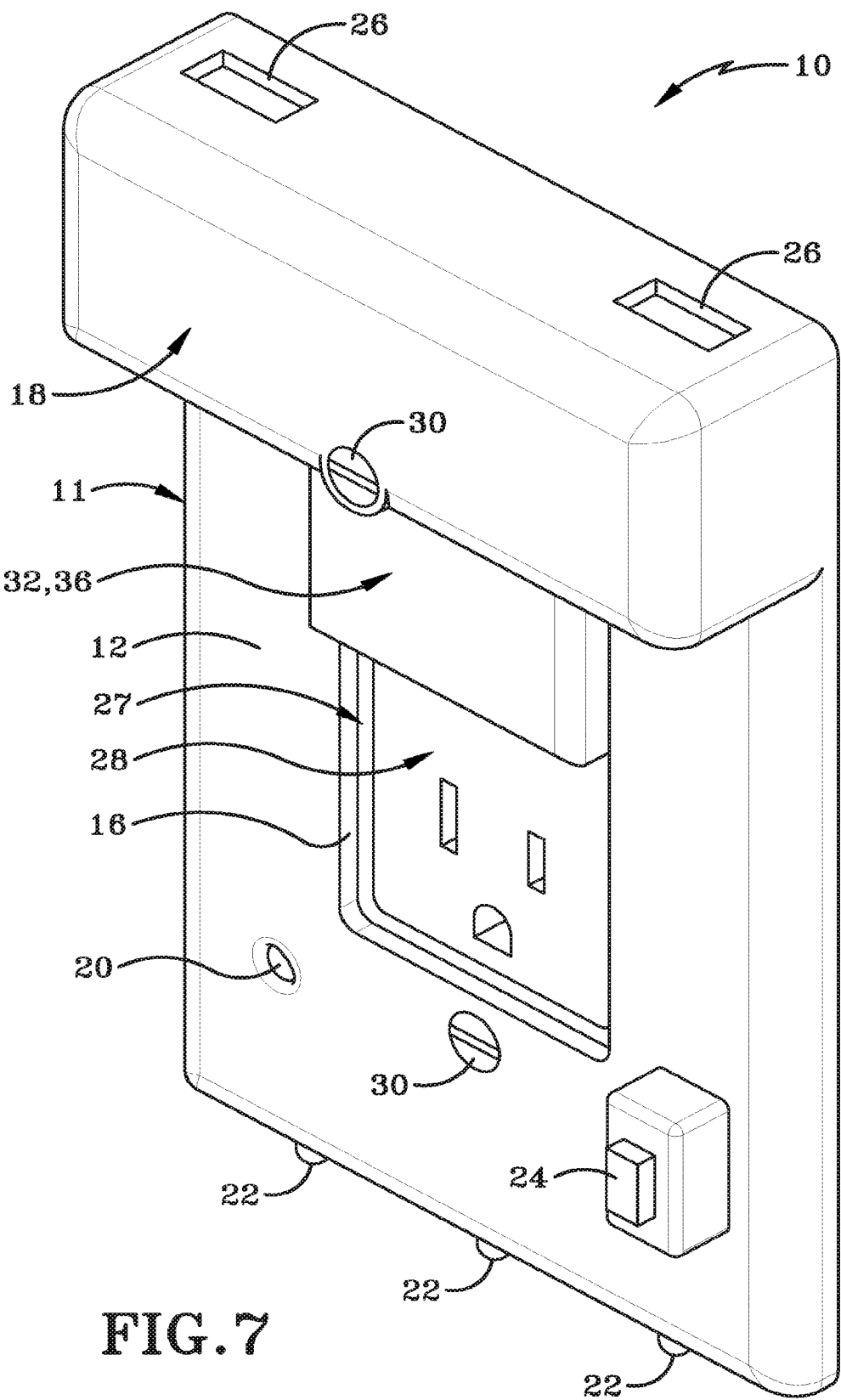
FIG. 7 is a perspective view of a second embodiment powered wall plate.
Figure 7A:
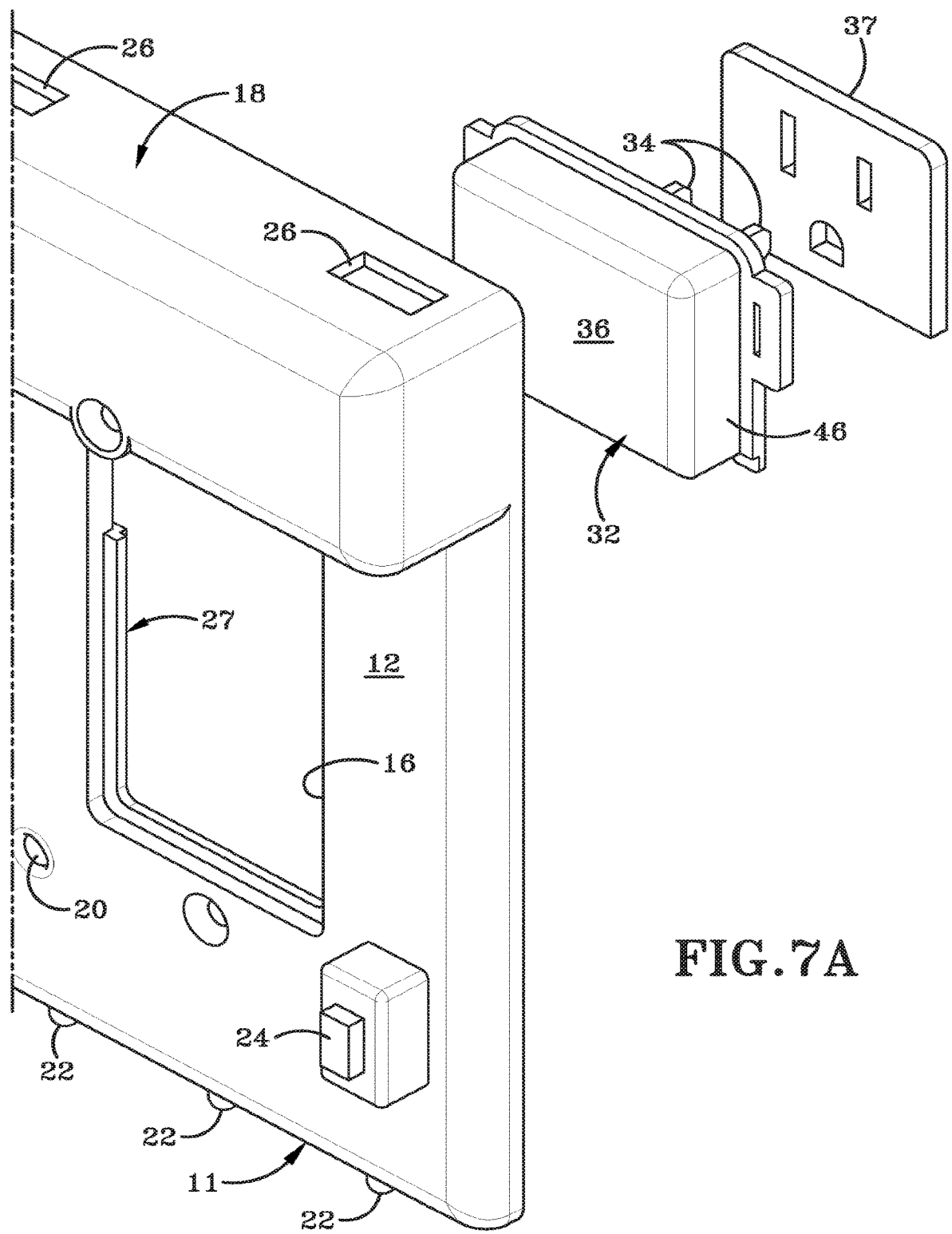
FIG. 7A is a exploded perspective view of the second embodiment powered wall plate.
Figure 8:
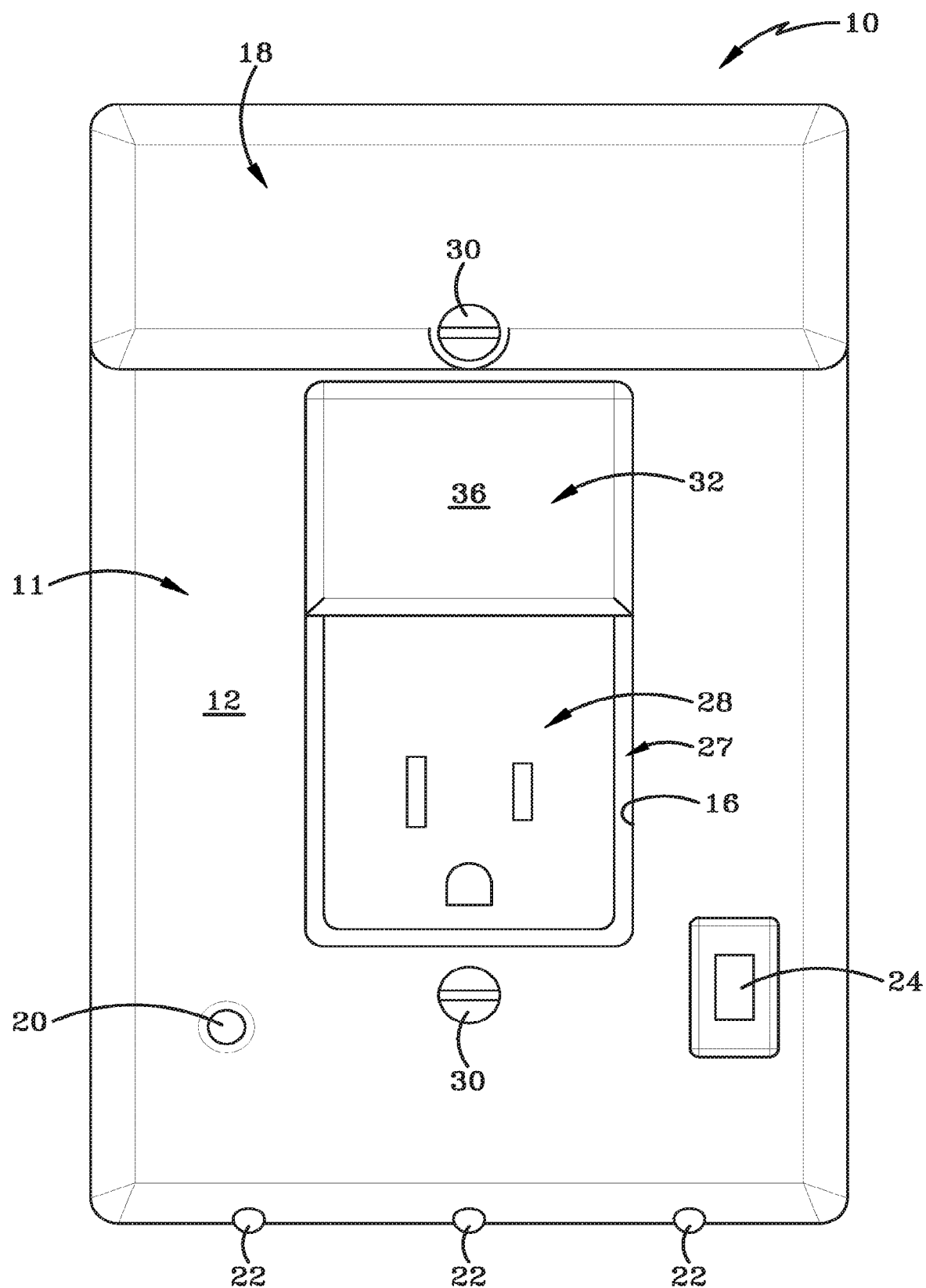
FIG. 8 is a front view of the second embodiment powered wall plate.
Figure 9:
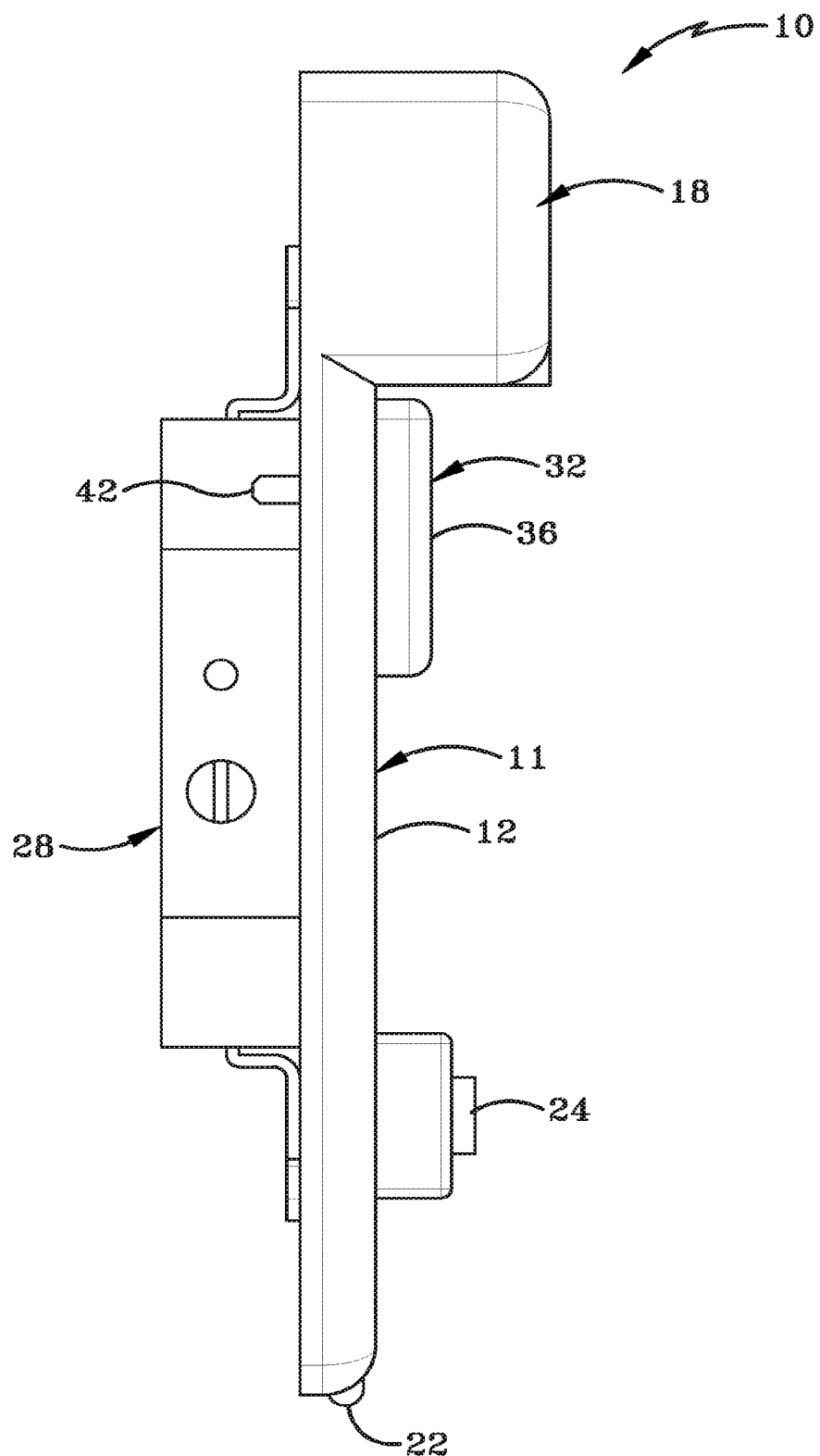
FIG. 9 is a left side view of the second embodiment powered wall plate.
Figure 10:
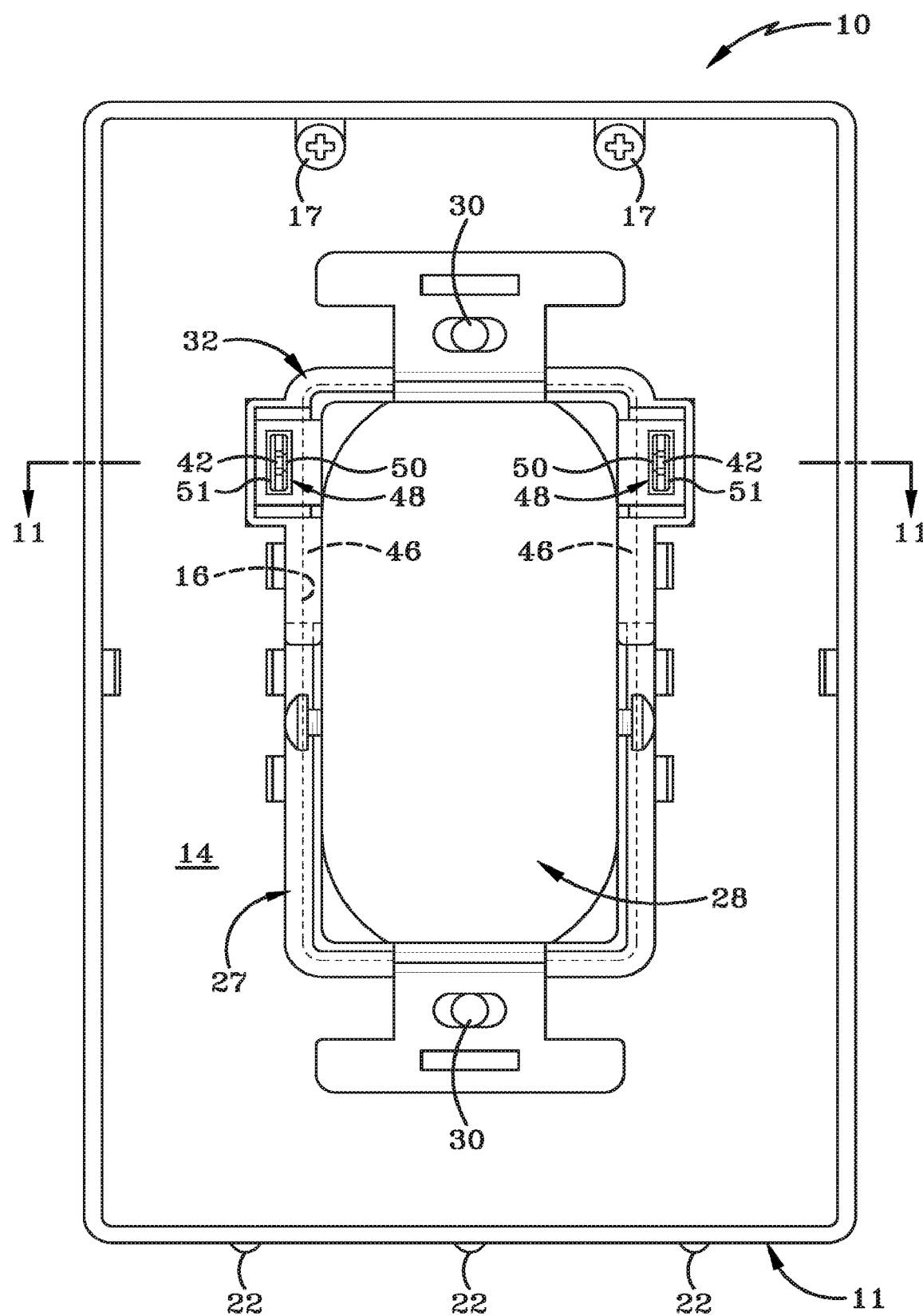
FIG. 10 is a rear view of the second embodiment powered wall plate.
Figure 10A:
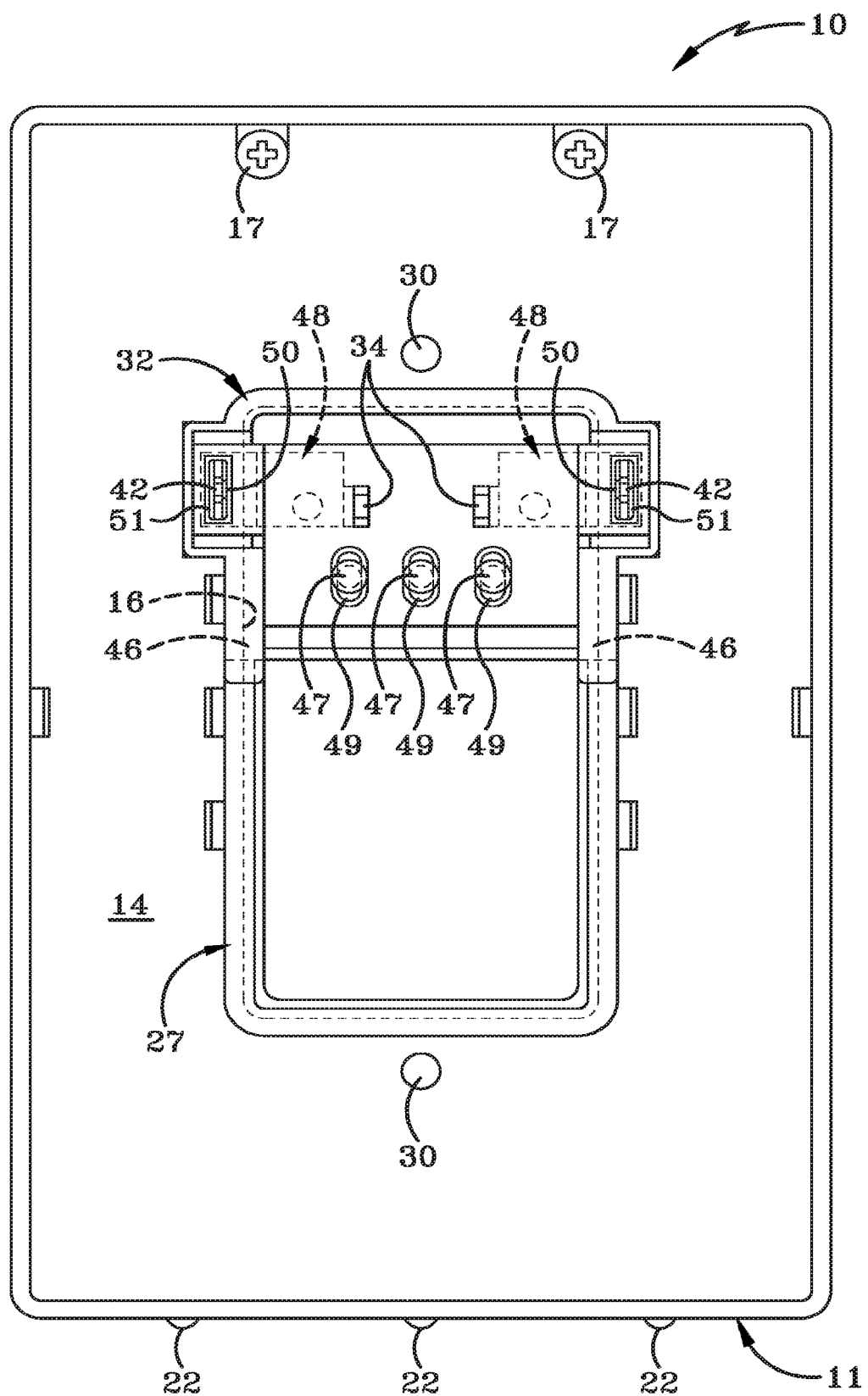
FIG. 10A is a rear view of the second embodiment powered wall plate with the electrical device removed.
Figure 10B:
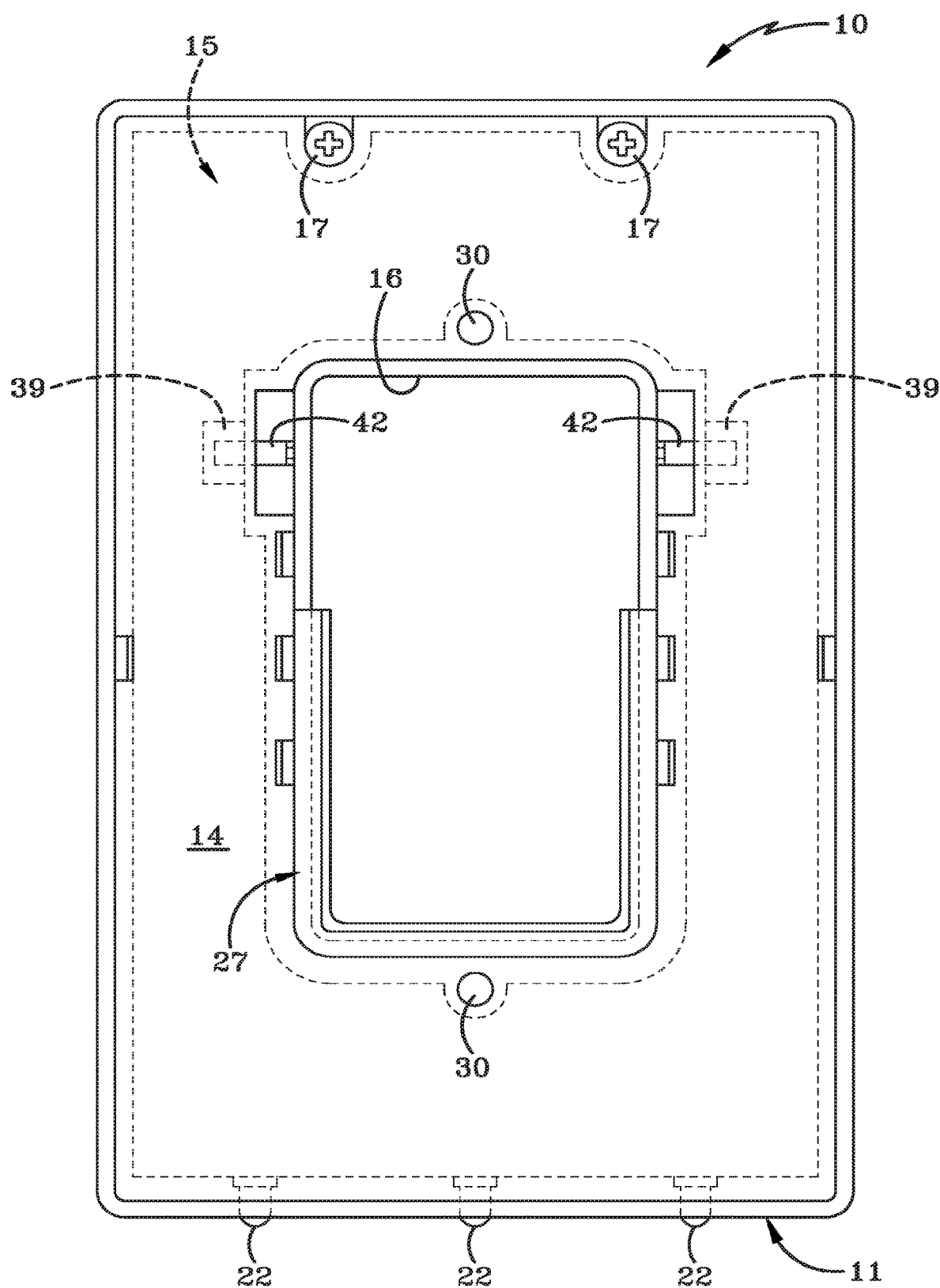
FIG. 10B is a rear view of the second embodiment powered wall plate with the electrical device and the plug-in module removed.
Figure 10C:
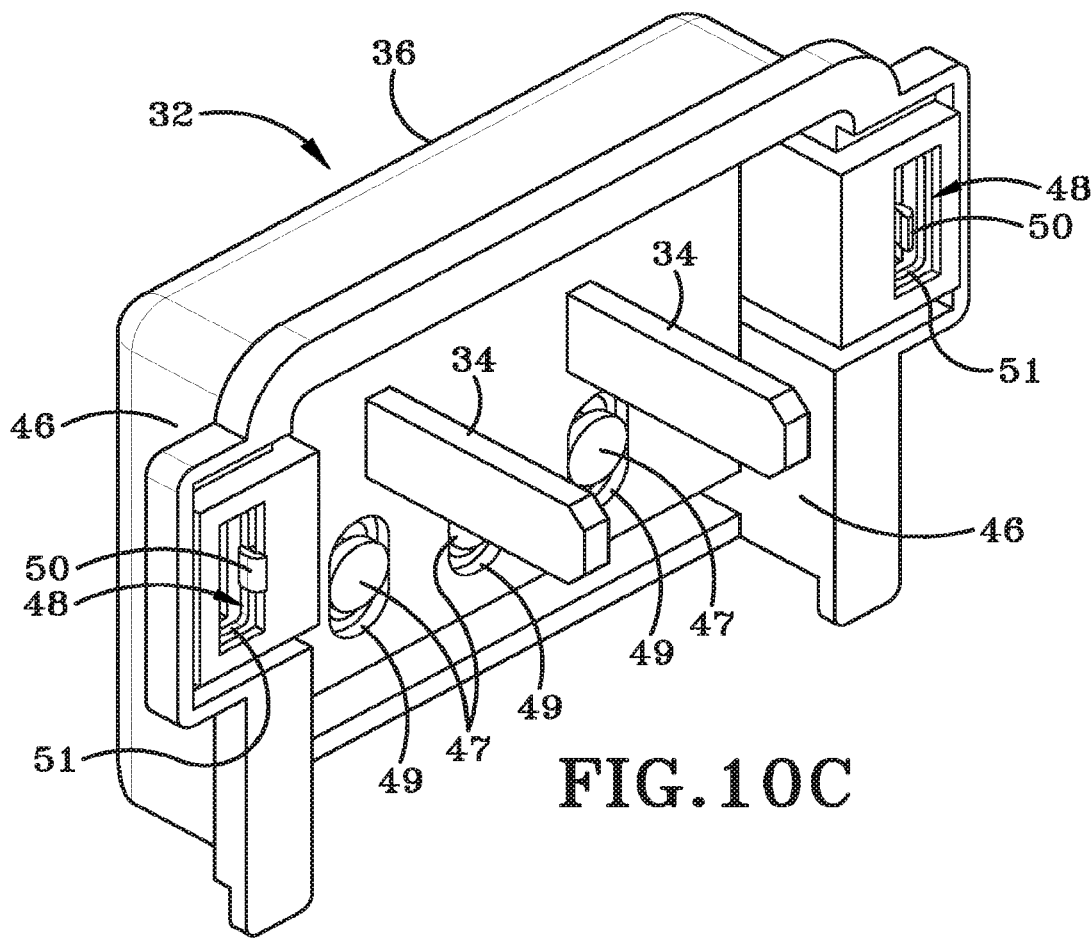
FIG. 10C is a rear perspective view of the plug-in module.
Figure 10D:
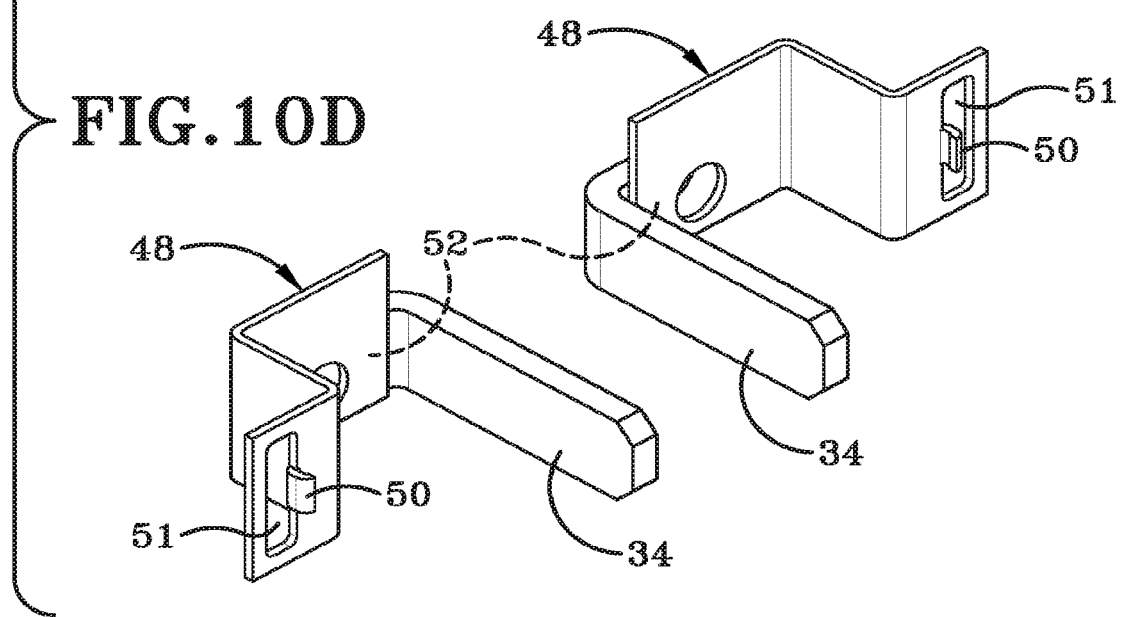
FIG. 10D is a view of the plug-in module current transfer unit.
Figure 10E:
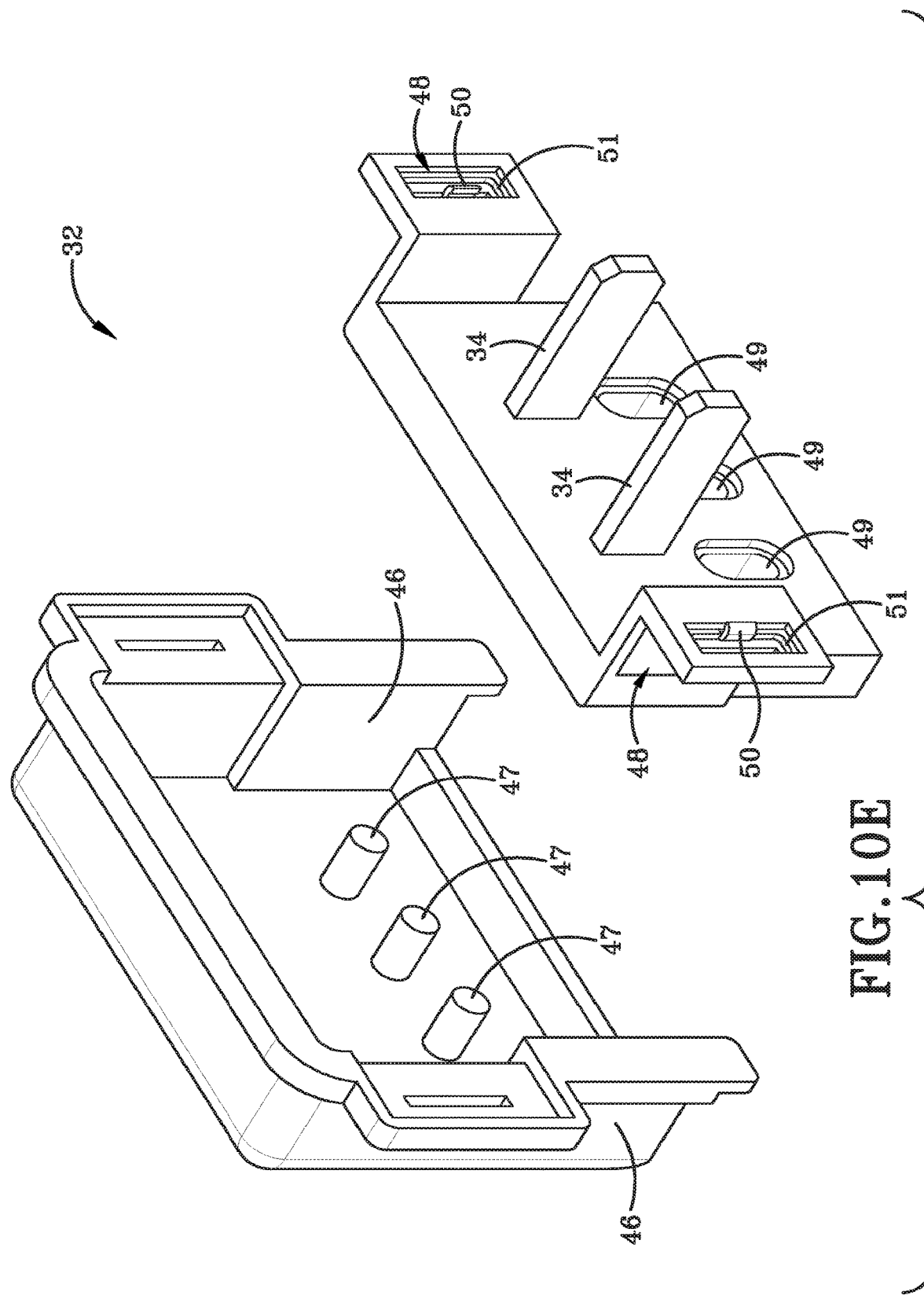
FIG. 10E is a rear exploded view of the plug-in module.

FIGS. 7 though 11A illustrate a second powered wall plate 10 which is structurally similar to the first embodiment powered wall plate described and show in FIGS. 1-6, but utilizes a plug-in module as will be described in more detail below. It is anticipated that the powered wall plate shown in FIGS. 1-11A may be sold with the components that could allow installation of either the hard wire version illustrated in FIGS. 1-6 or the plug-in module version shown more specifically in FIGS. 7-11A without departing from the sprit and scope of the present disclosure.

Wall plate 10 includes a plug-in module 32 having a front surface 36, prongs 34, and arms 46 extending outward from each side. Arms 46 each include a current transfer unit 48 having a current transfer contact 50 therein. Each current transfer contact 50 is operatively connected to prongs 34 to receive electrical current from the electrical device and transfer the electrical current to the circuit board via wall plate interface 39 and wall plate current feature 42 to power the wall plate. Each current transfer unit 48 may include an aperture 51 adapted to receive the wall plate current feature 42 adjacent current transfer contact 50.

Plug-in module 32 may also be oriented to slide plugs 34 upwards or downwards to ensure that the plug-in module can be utilized with any type of electrical device and still transfer electrical current to the wall plate current feature 42. For example, the plug-in module body may include rivets 47 arranged to receive apertures 49 which are elongated and may include a recessed portion. The recessed portion allows the rivets 47 to be compressed at the head and allow the plugs 34 to move upward and downwards relative to the rivets 47 but still be retained to prevent disconnection. This upward or downward relative movement may be important in some circumstances where device dimensions vary. Specifically, the distance between the powered wall plate mounting screw and the upper or lower electrical prong apertures on electrical device 28 may be different for a duplex receptacle, a decorator receptacle, or a GFCI receptacle for example or due to manufacturer styles. With the incorporation of this adjustable feature, the powered wall plate 10 is designed to work regardless of the device style or manufacturer, saving time, energy, and retailer stocking needs.

The plug-in module 32 may also include spring biased shutters 71 which surround plugs 34. Shutters 71 are compressed by the electrical device front face when the wall plate is appropriately positioned or are used to ensure that a user is not electrocuted if a portion of electrical plug 34 would otherwise be visible due to a gap between the wall plate and the electrical device. Operation is simple and the spring is biased to the extended position and compressed as appropriate, thereby prevent direct access to the plugs 34 by a user after installation but still allowing full plug prong insertion if possible. If spring biased shutters 71 are omitted, a spacer 37 may be utilized to restrict access to the prongs 34 and prevent electrocution.

Figure 11A:
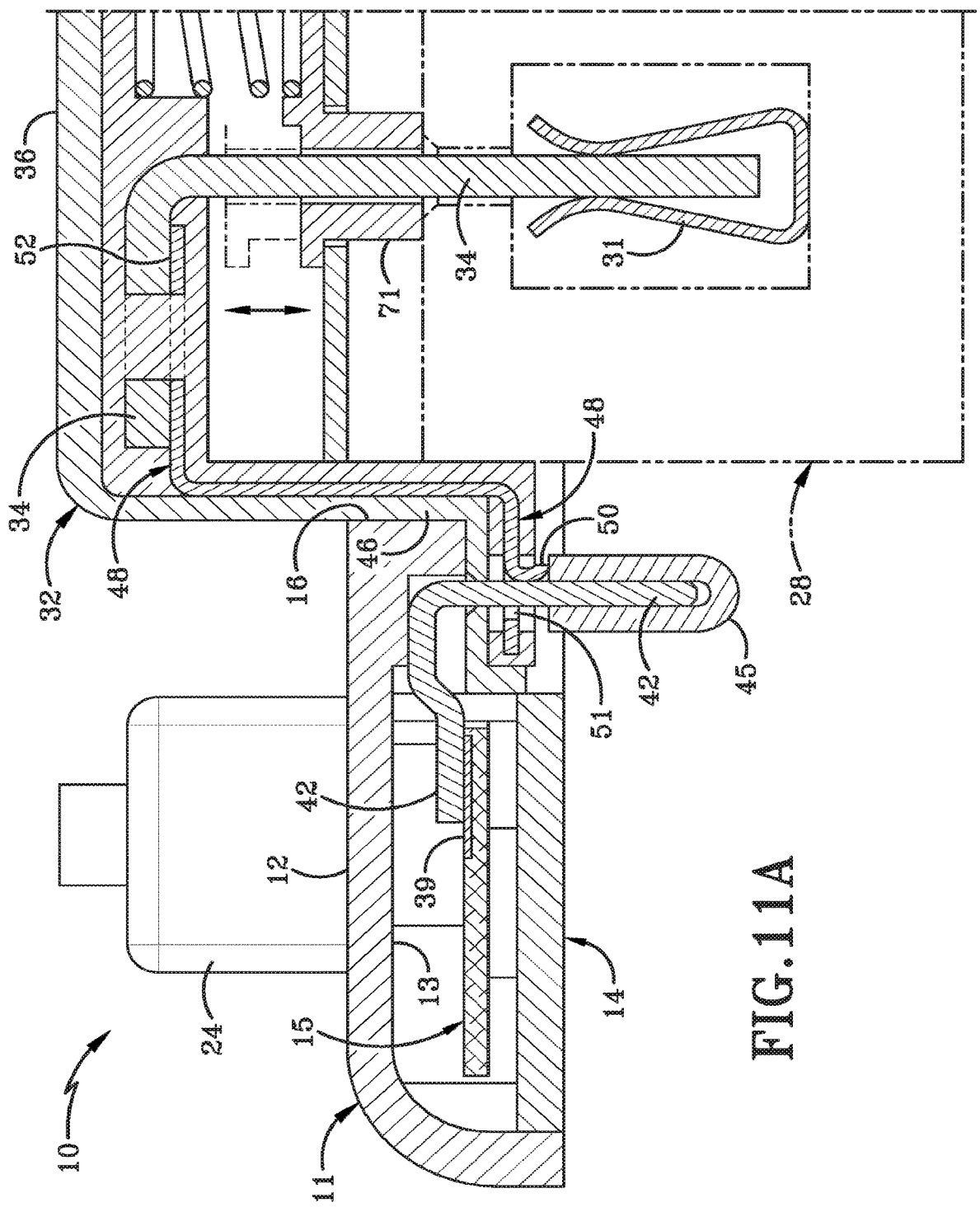
FIG. 11A is a sectional view taken generally about line 11-11 in FIG. 10 and including a cap.

FIG. 11A illustrates another implementation with a cap 45 positioned on the wall plate current feature 42. Thus it is seen that electrical current is easily transferred from the electrical device to the wall plate in a safe and efficient manner.

Installation of the powered wall plate with the plug-in module includes positioning the plug-in module 32 on the wall plate current feature 42, then installing the wall plate on the electrical device and potentially sliding the plug-in module prongs 34 upwards or downwards slightly to align with the electrical device. Finally, the powered wall plate 10 is secured to the electrical box or electrical device with screws 30. In an alternative installation, the plug-in module 32 is positioned in the electrical device and the wall plate is then positioned so the wall plate current features 42 fit within aperture 51 of arms 46, thereby connecting the plug-in module 32 and the wall plate 10 to transfer current. Regardless of the order of the steps used to install the powered wall plate, the plug-in module 36 provides a simple and efficient way to power the wall plate without hard wiring and may instead be used as a user selected alternative to hard wiring.

While FIGS. 7-11A illustrate the plug-in module 32 being positioned on only the upper electrical device openings, it is within the spirit and scope of the present disclosure to position the plug-in module in the lower electrical device openings. A person of skill in the art will appreciate that the powered wall plate will simply need to position wall plate current features 42 consistent with the lower electrical device openings. An alternative implementation would be to include multiple sets of wall plate current features 42 at strategic positions on wall plate 10 and utilize caps 45 where necessary to prevent current transfer or electrocution.

Figure 12:
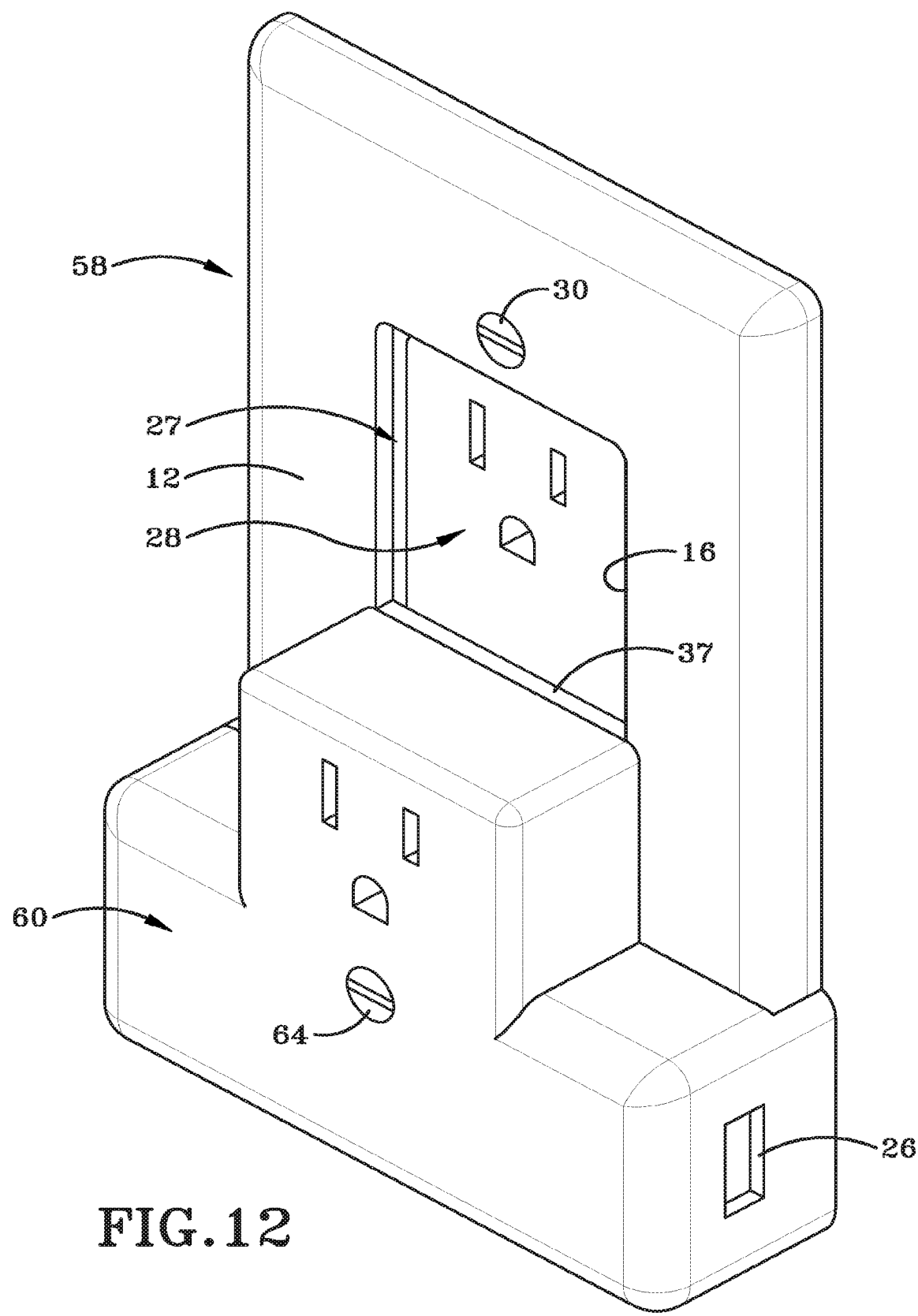
FIG. 12 is a perspective view of a third embodiment powered wall plate.
Figure 13:
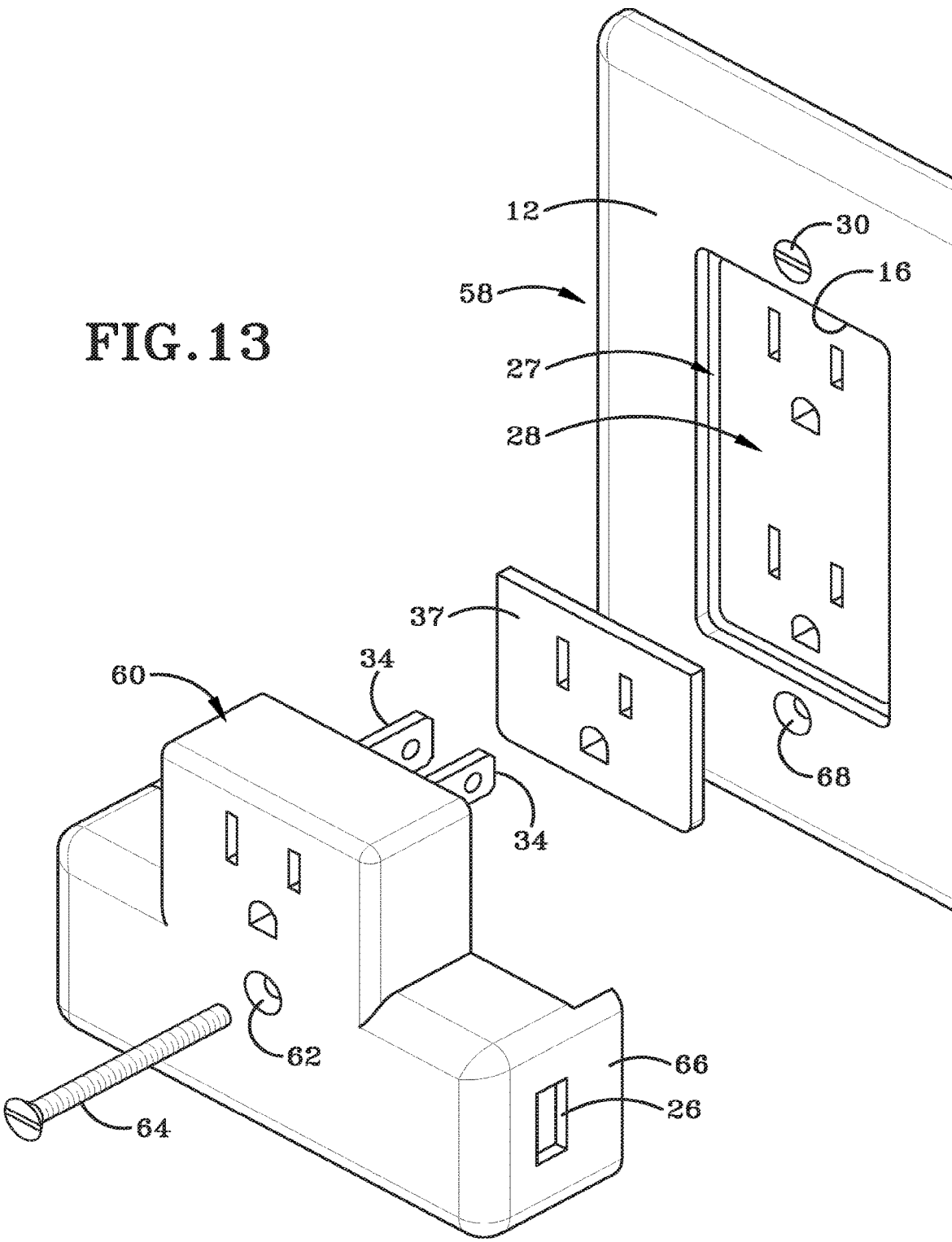
FIG. 13 is an exploded view of the third embodiment powered wall plate.
Figure 14:
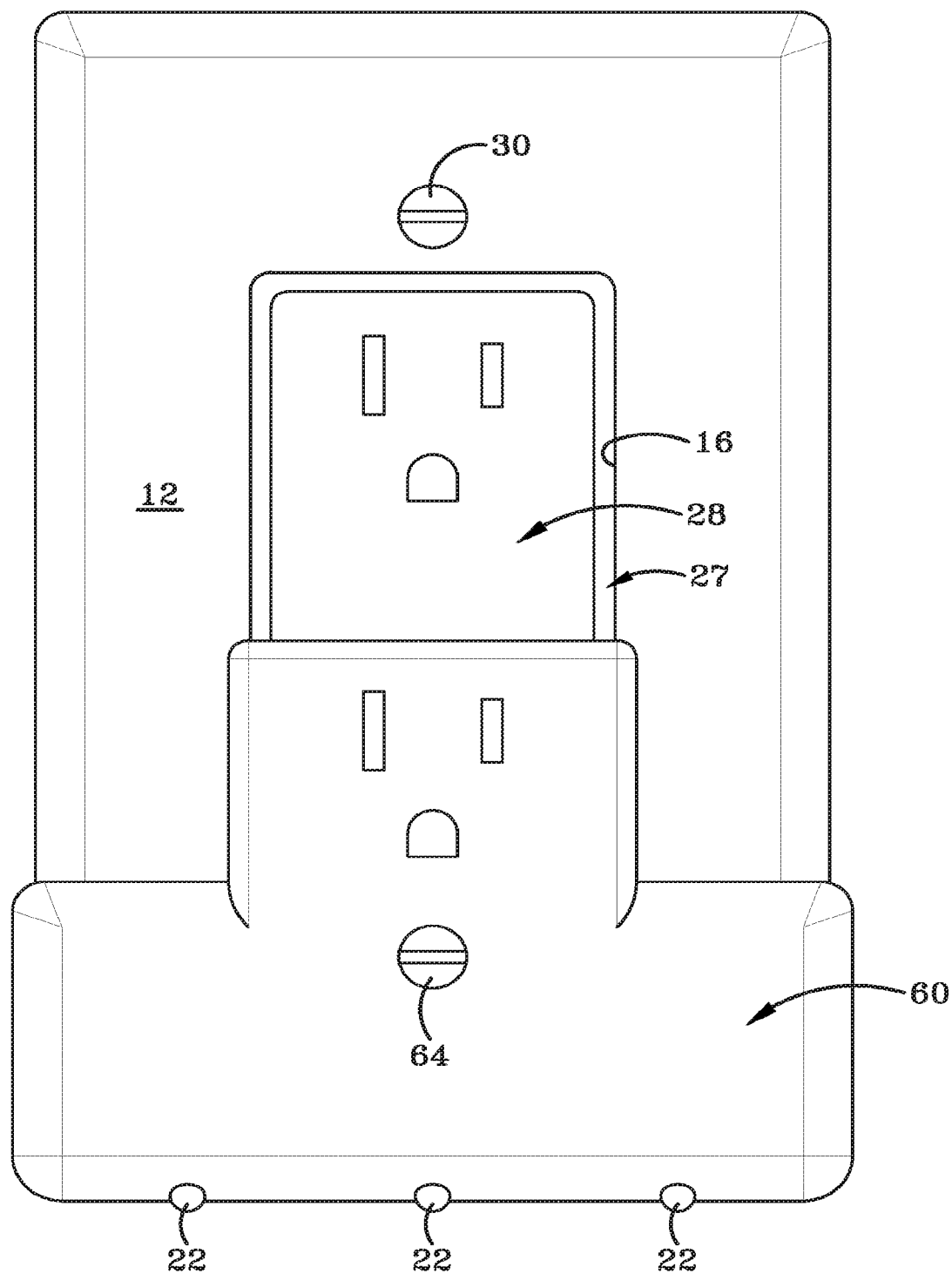
FIG. 14 is a front view of the third embodiment powered wall plate.

FIGS. 12-14 illustrate a third aspect powered wall plate 58 having a body 12 and a plug-in module 60. Plug-in module 60 in this implementation may be larger and include a power transformer, USB ports 26, lights 22, a photosensor, controls, and other features. Advantageously, plug-in module 60 may also include a through hole 62 aligned with a wall plate mounting aperture 68 both arranged to receive a screw 64. In this manner, wall plate body 12 is installed with screw 30, then plug-in module 60 is installed into the electrical device with prong 34 (and spacer 37 if required). Screw 64 is then positioned through holes 62 and 68 to secure the components together with surrounds 66 covering a portion of body 12 to provide an aesthetically pleasing appearance. This way the plug-in module 60 functions like similar illustrations but is easier to install and operate.

Figure 15:
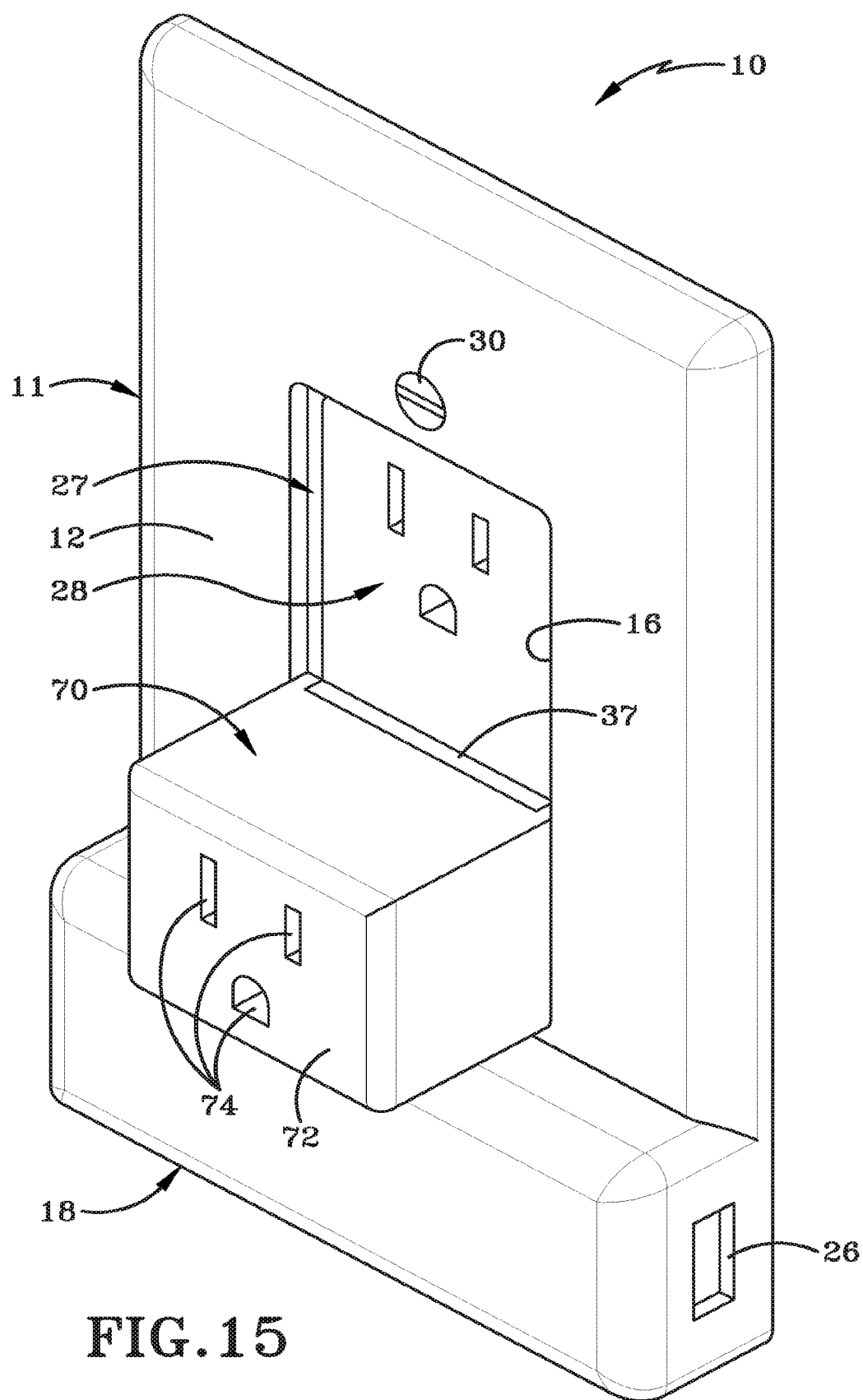
FIG. 15 is a perspective view of a fourth embodiment powered wall plate.
Figure 15A:
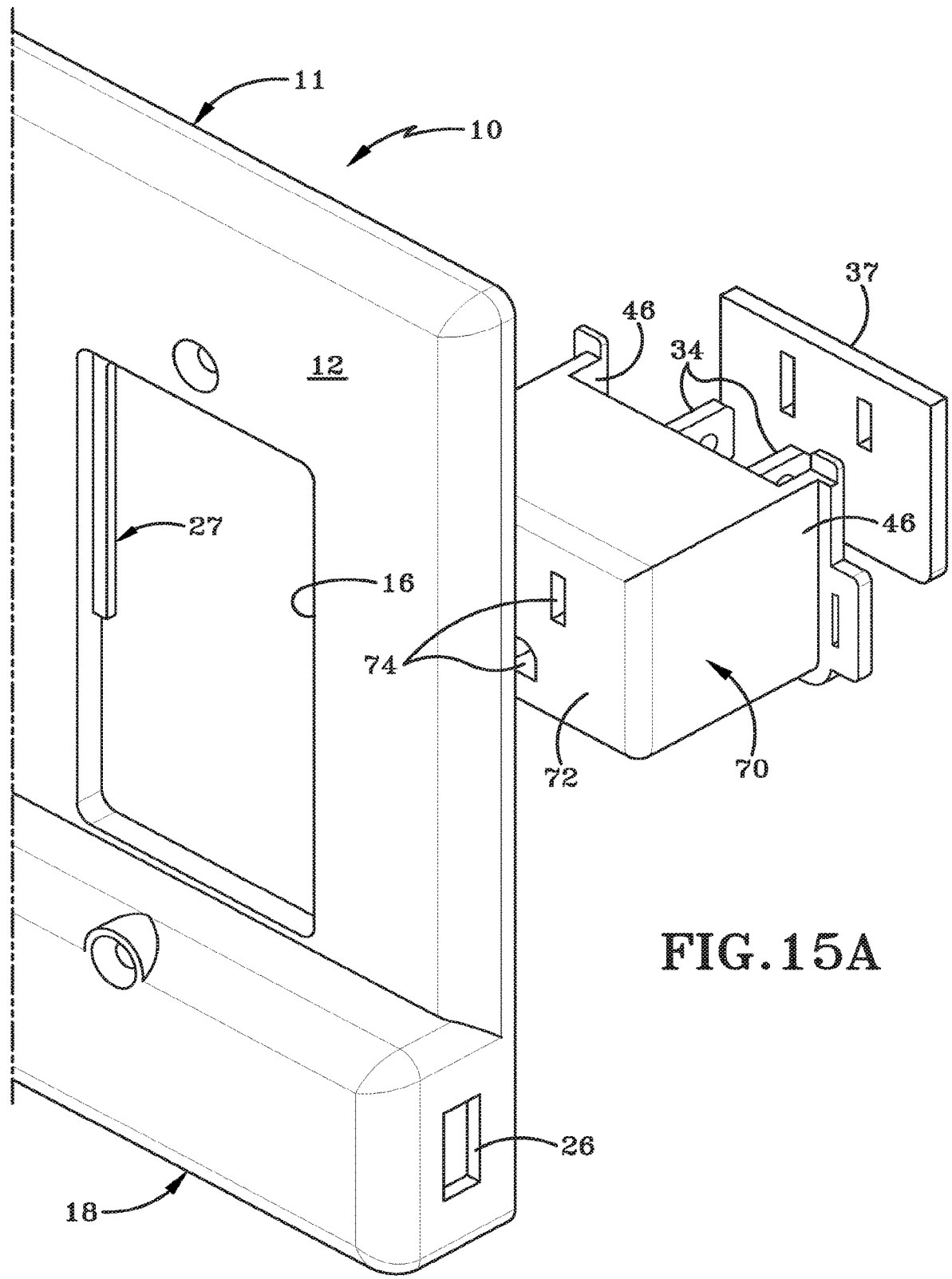
FIG. 15A is an exploded view of the fourth embodiment powered wall plate.
Figure 16:
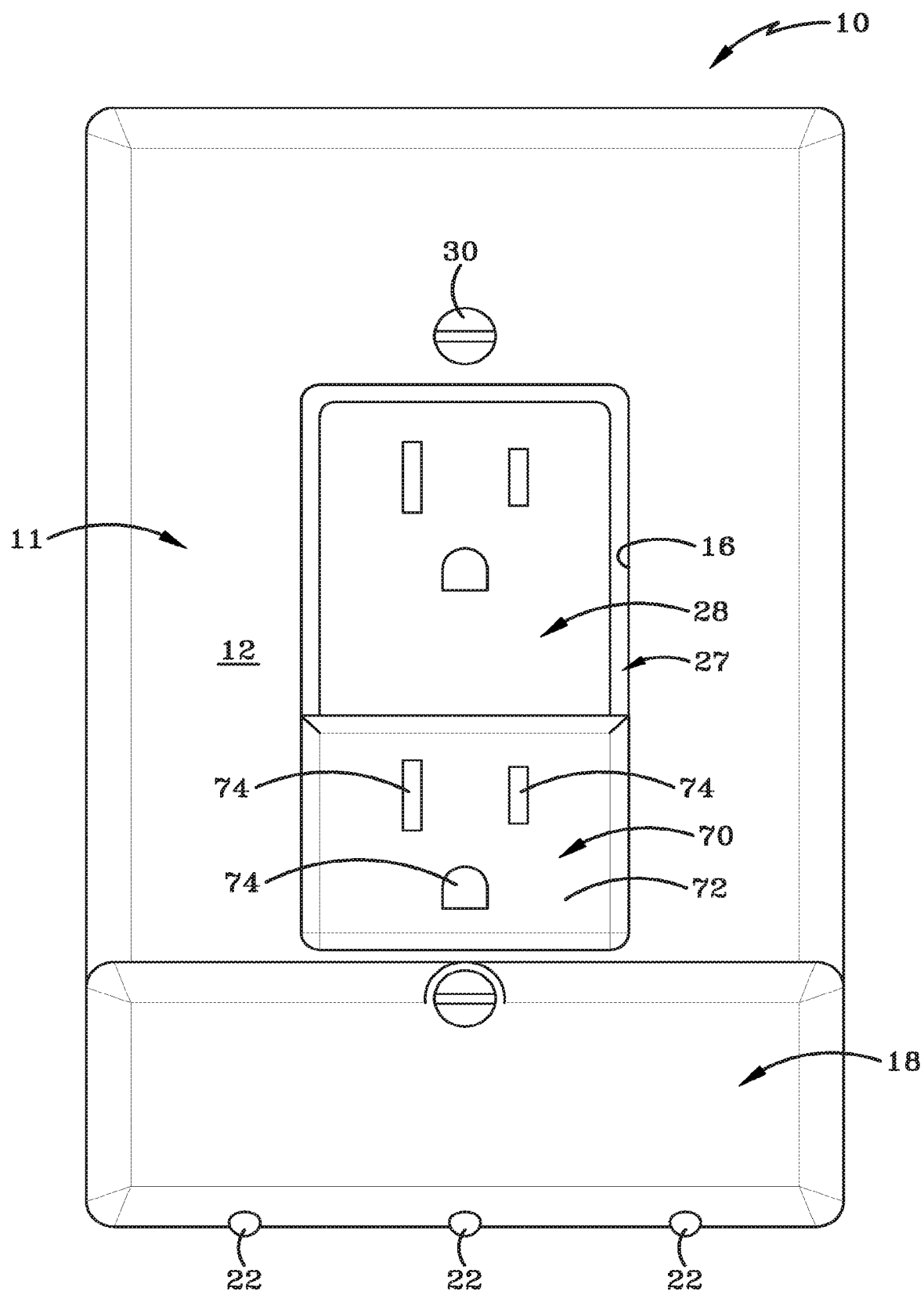
FIG. 16 is a front view of the fourth embodiment powered wall plate.
Figure 17:
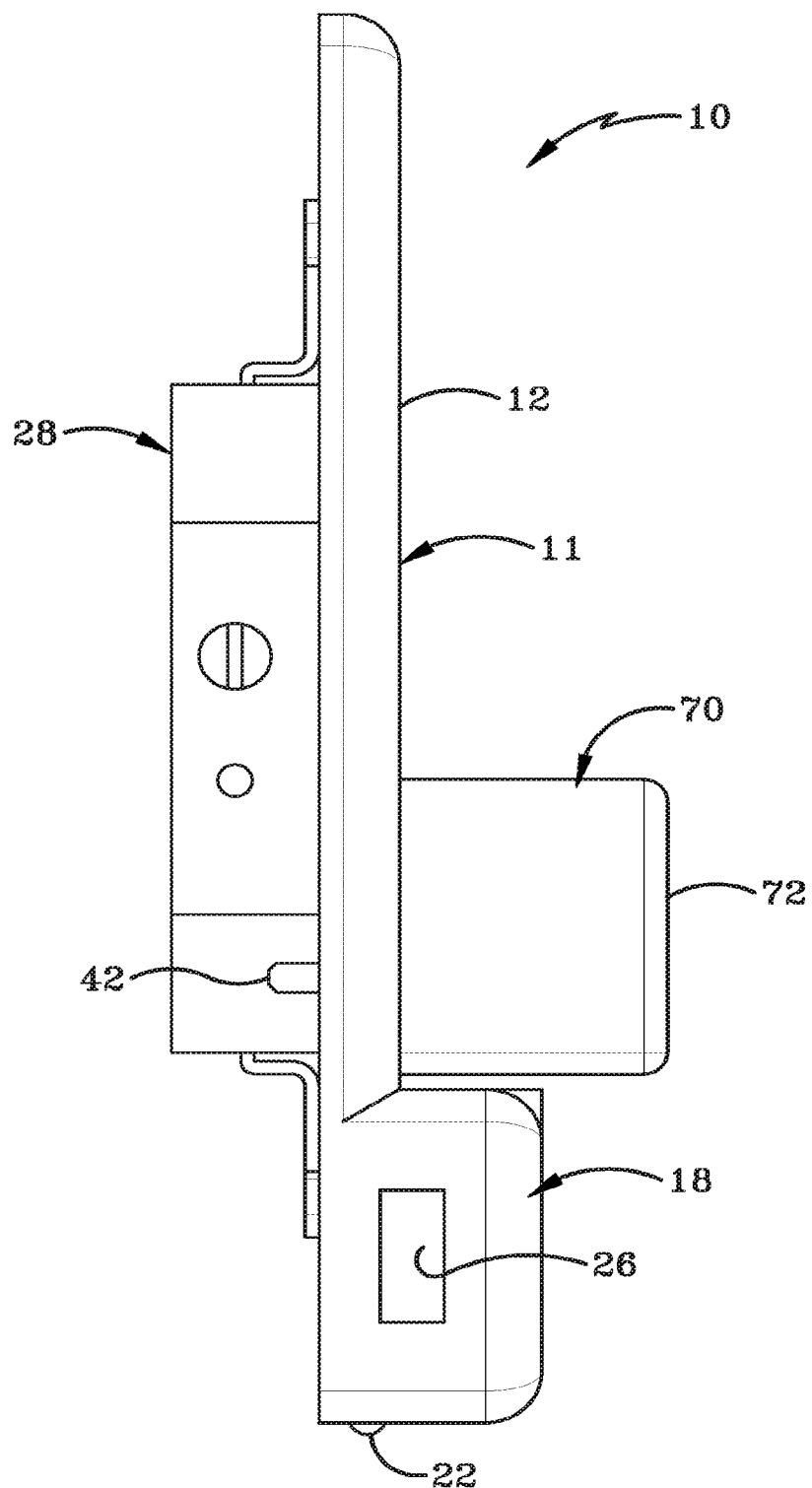
FIG. 17 is a side view of the fourth embodiment powered wall plate.
Figure 18:
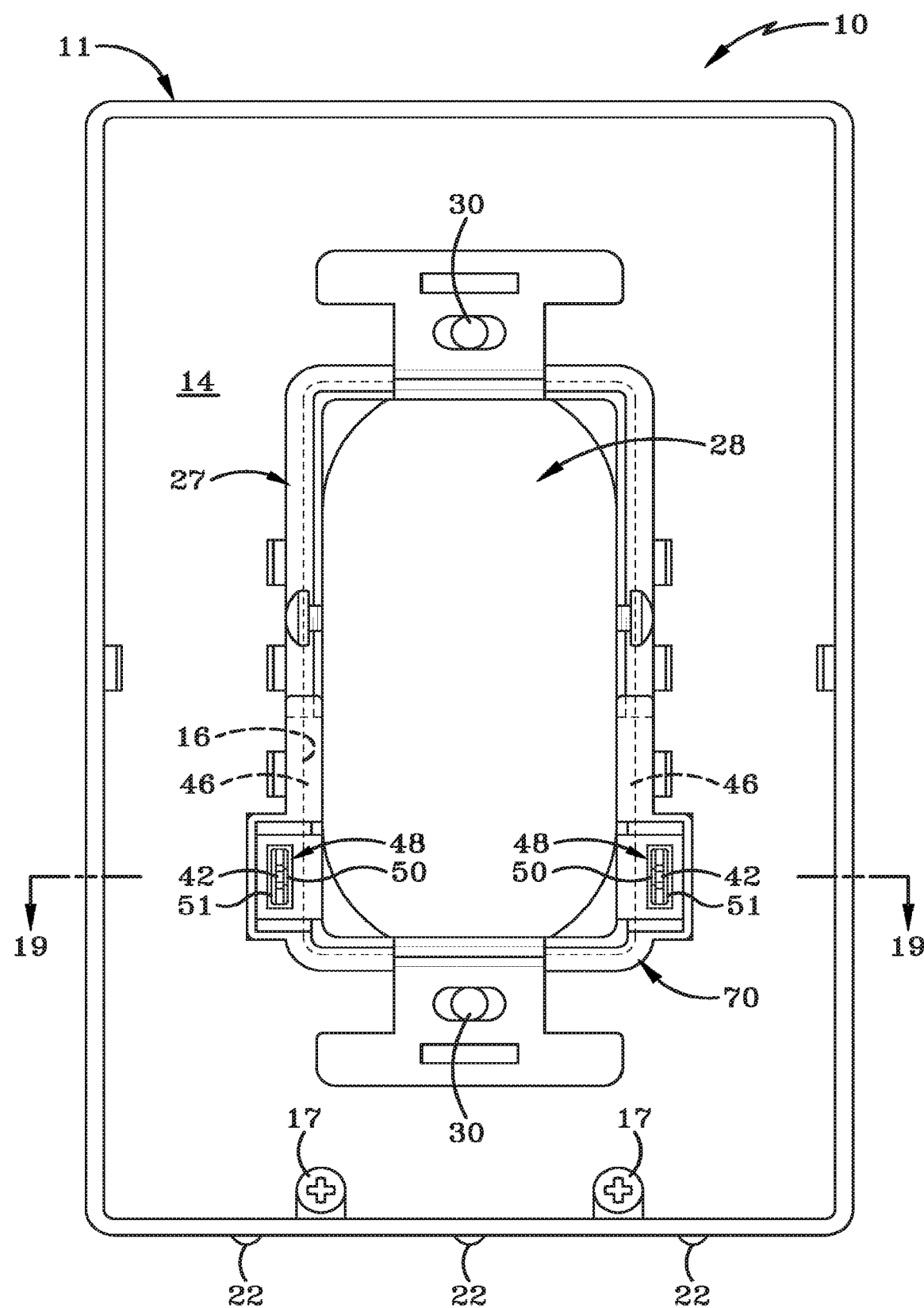
FIG. 18 a rear view of the fourth embodiment powered wall plate.
Figure 18A:
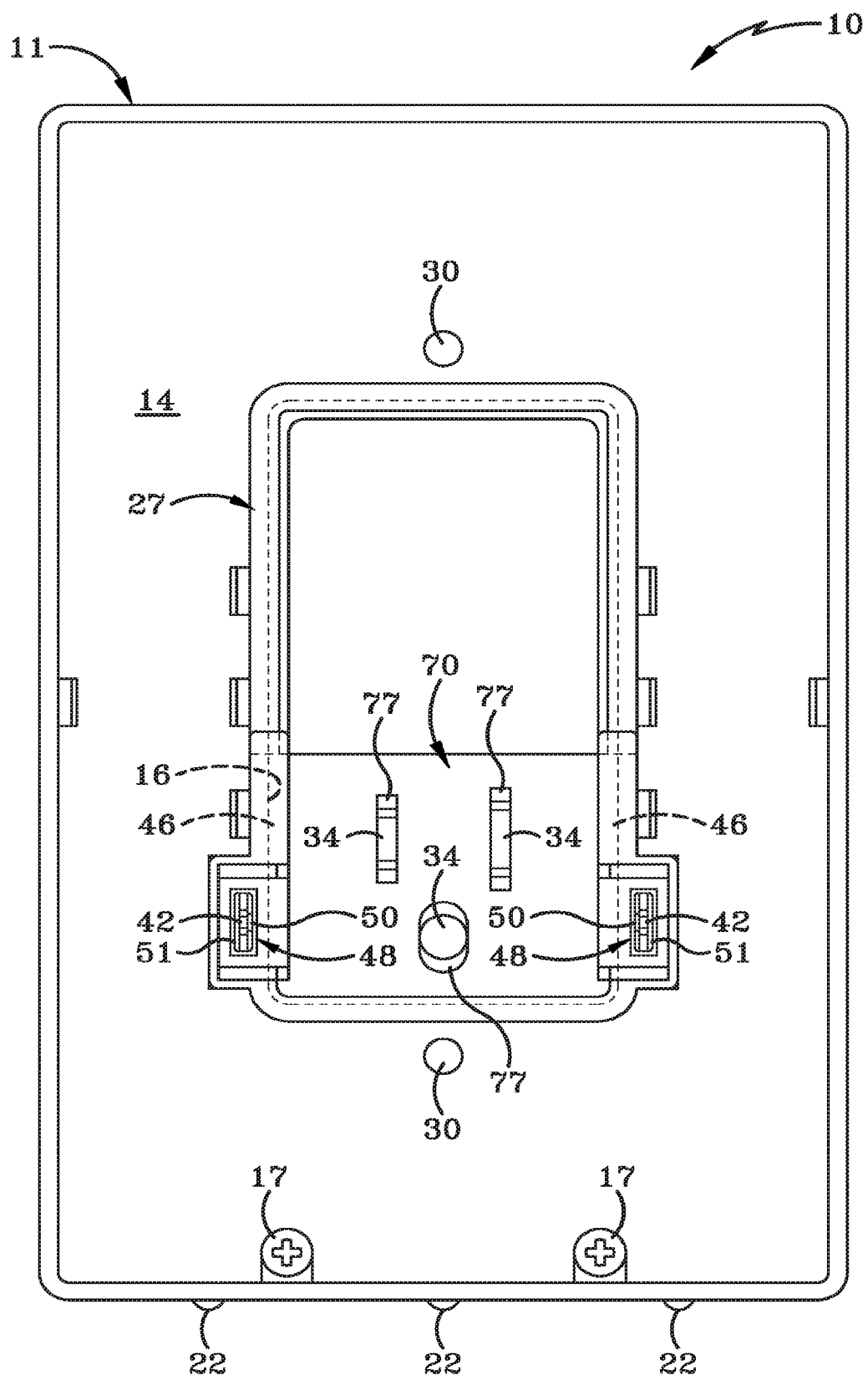
FIG. 18A is a rear view of the fourth embodiment powered wall plate with the electrical device removed.

FIGS. 15-19D illustrate a fourth aspect powered wall plate 10 having a plug-in module 70. As seen in the various views, plug-in module 70 is similar to plug-in module 32 but also includes a front surface 72 having a plurality of apertures 74 therein for receiving an electrical plug therein. In this manner, plug-in module 70 can be positioned within opening 16 of faceplate body 11 and transfer electrical current to powered wall plate 10 similar to previously disclosed embodiments but still provide a plurality of apertures 74 so that the user does not lose access to an electrical outlet. As can also be seen, a spacer 37 may also be utilized to ensure that any gaps which would expose any electrical active components. As further seen in FIG. 15A, adapters 27 may be utilized to fill any potential gaps around the plug-in module 70 and body 11 of powered wall plate 10.

From a functional stand point, the powered wall plate 10 shown in FIGS. 15-19D operates to receive electrical current from the electrical device similar to prior disclosed aspects, such as those shown in FIGS. 7-11A. Similarly, arms 46 each include a current transfer unit 48 having a current transfer contact 50 therein, with each current transfer contact 50 adapted to connect to wall plate current feature 42 to provide electrical current to the powered wall plate 10.

Figure 19:
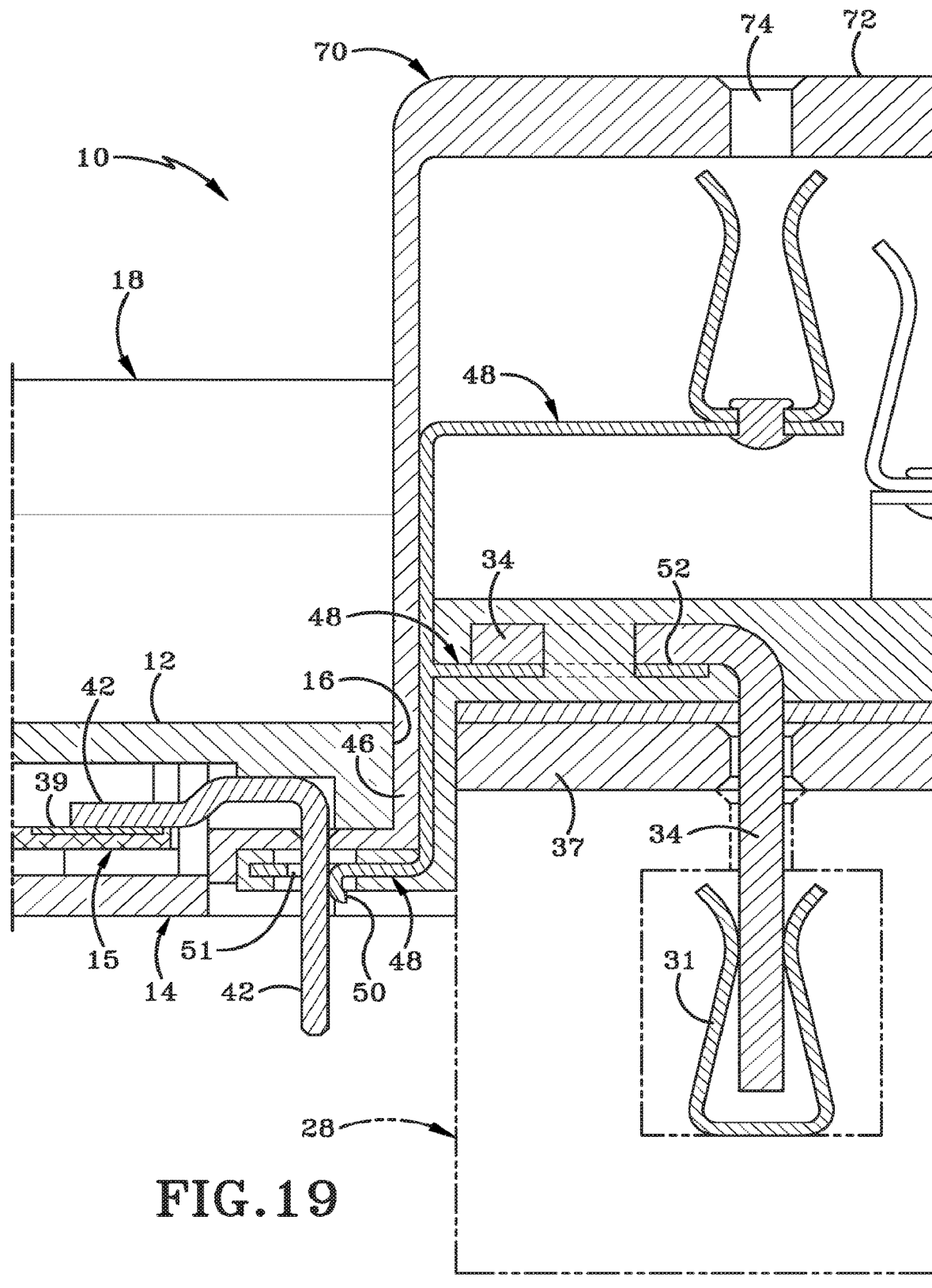
FIG. 19 is a sectional view taken generally about line 19-19 in FIG. 18.
Figure 19A:
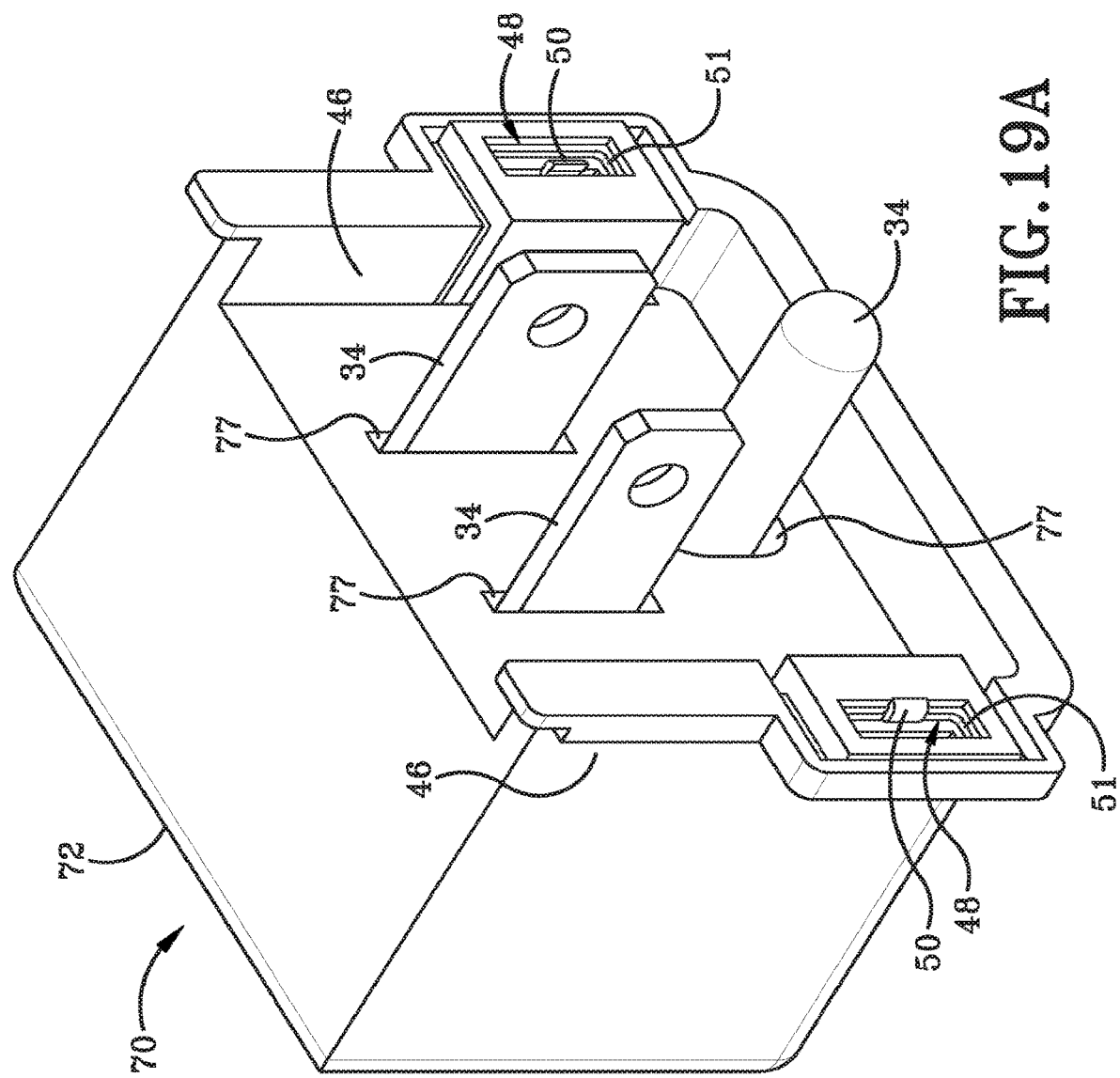
FIG. 19A is a rear perspective view of the plug-in module.

Moving to FIG. 19A, plug-in module electrical prongs 34 are shown extending through apertures which are slightly elongated to allow vertical movement of plug-in module 70 electrical prongs 34 to allow slight adjustments in spacing between the powered wall plate 10 and the electrical device in the electrical box.

Figure 19B:
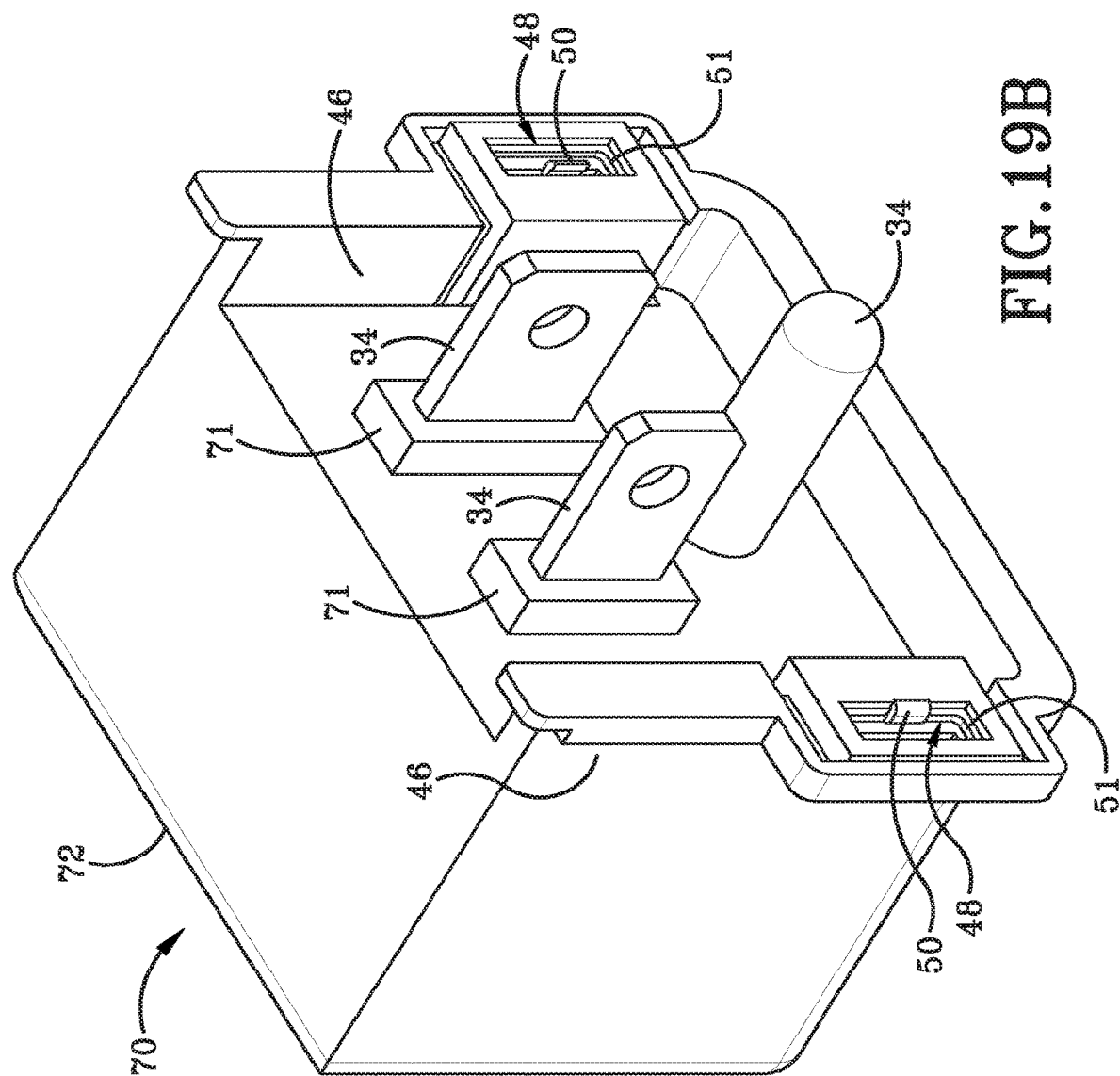
FIG. 19B is a rear perspective view of an alternative plug-in module.

FIG. 19B illustrates a similar plug-in module 70 but illustrates spring biased shutters 71 which function to protect the user from electrocution. Similar to other aspects, spring biased shutters 71 may be compressed by an electrical device face if no protection is needed and may remained extended to protect the plug-in module electrical prong 34 should a small gap otherwise remain.

Figure 19C:
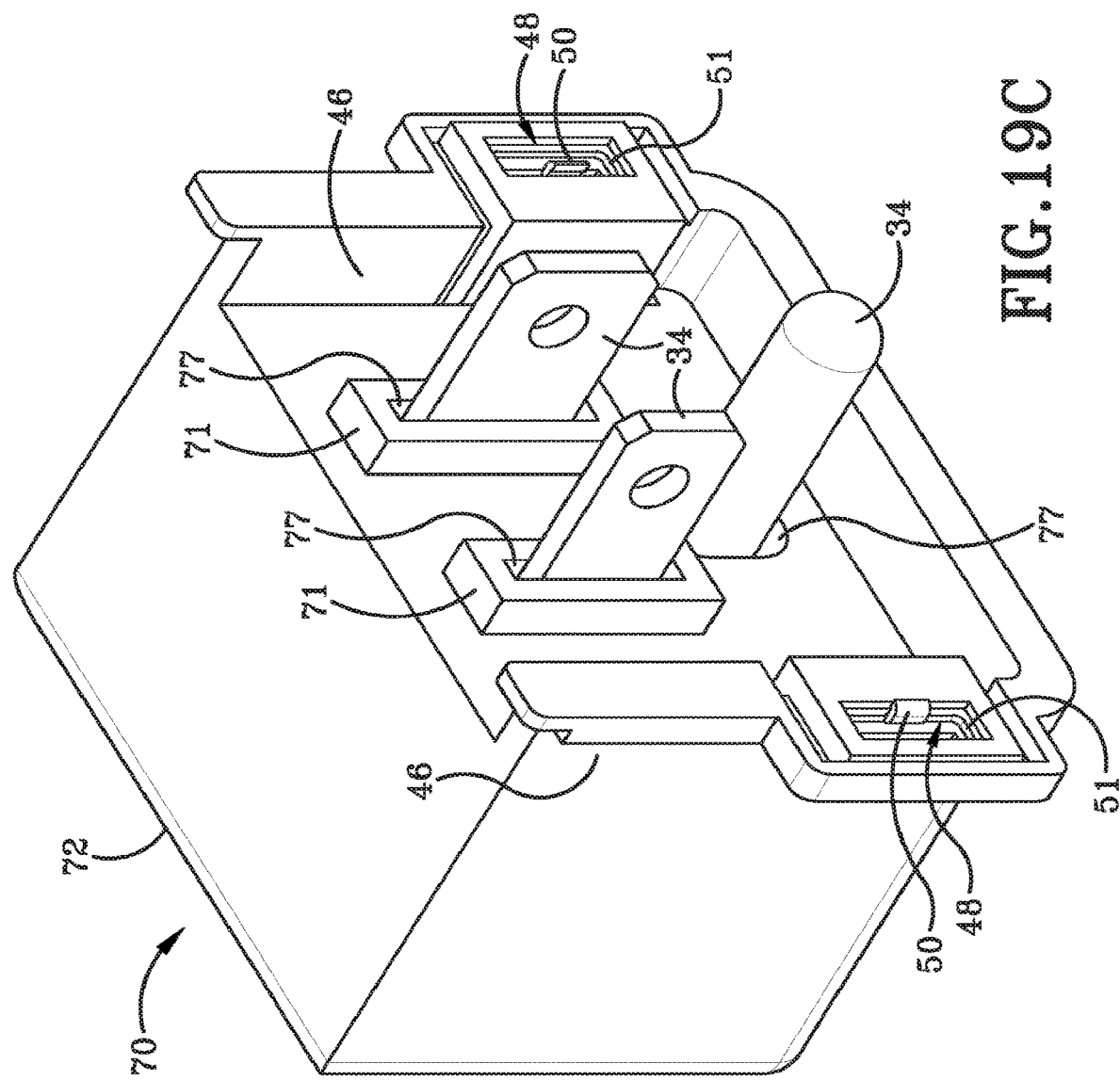
FIG. 19C is a rear perspective view of an alternative plug-in module.

FIG. 19C illustrates a combination of the plug-in module 70 from 19A and 19B. Namely, plug-in module 70 of 19C includes both spring biased shutters 71 and elongated apertures to allow plug-in module electrical prongs 34 to move and allow appropriate adjustment.

Figure 19D:
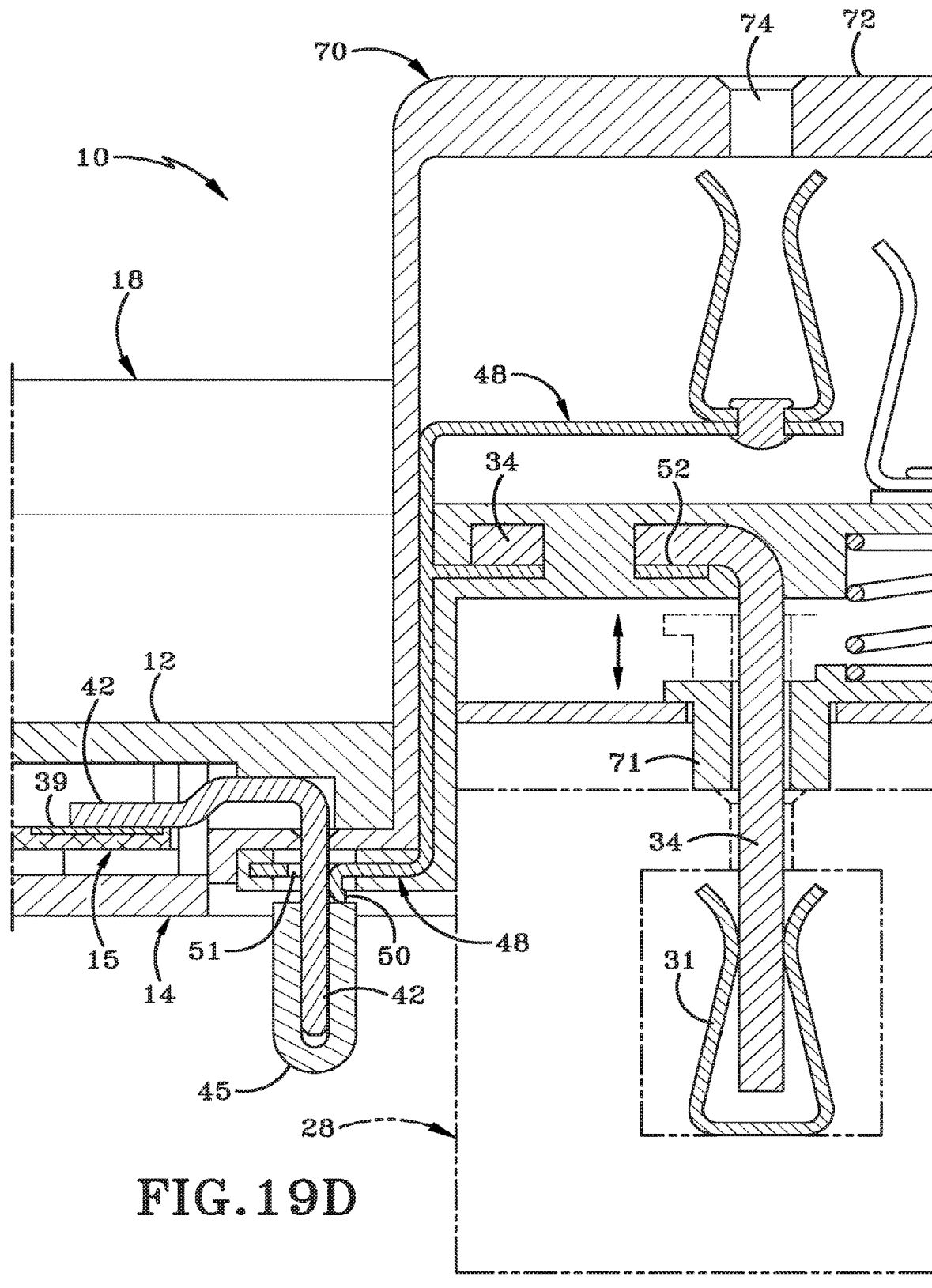
FIG. 19D is a sectional view taken generally about line 19-19 in FIG. 18 and including a cap.

FIG. 19D illustrates plug-in module 70 including a cap 45 similar to previously discussed aspects. Once again, cap 45 functions to prevent and/or restrict potential electrical shock or grounding in case wall plate current feature 42 were to come in contact with another conductive material. Accordingly, it is seen that the various implementations of powered wall plate 10 shown in FIGS. 15-19D may be implemented to power the wall plate while also not reducing the number of available electrical apertures.

Figure 20:
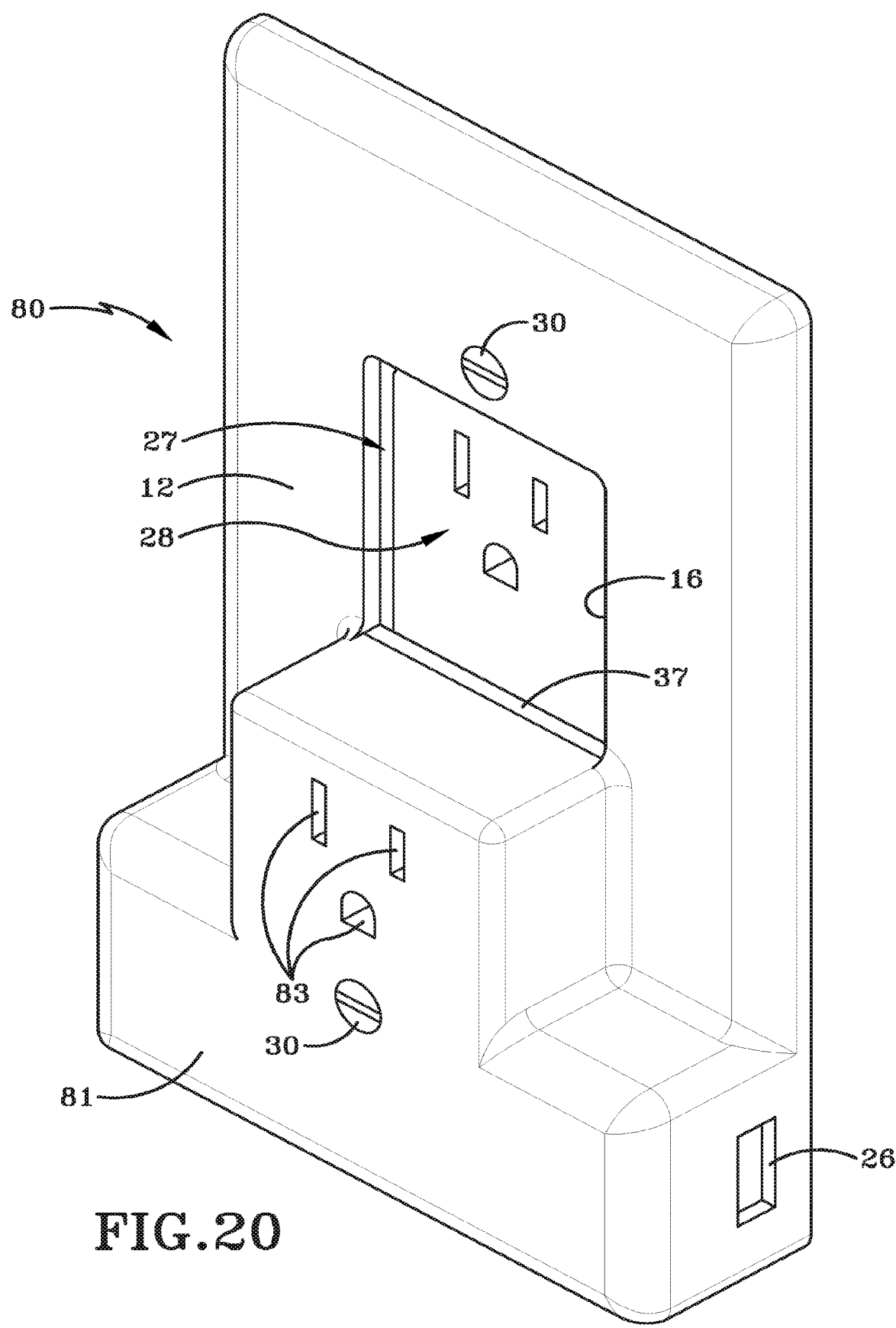
FIG. 20 is a perspective view of a fifth embodiment powered wall plate.
Figure 21:
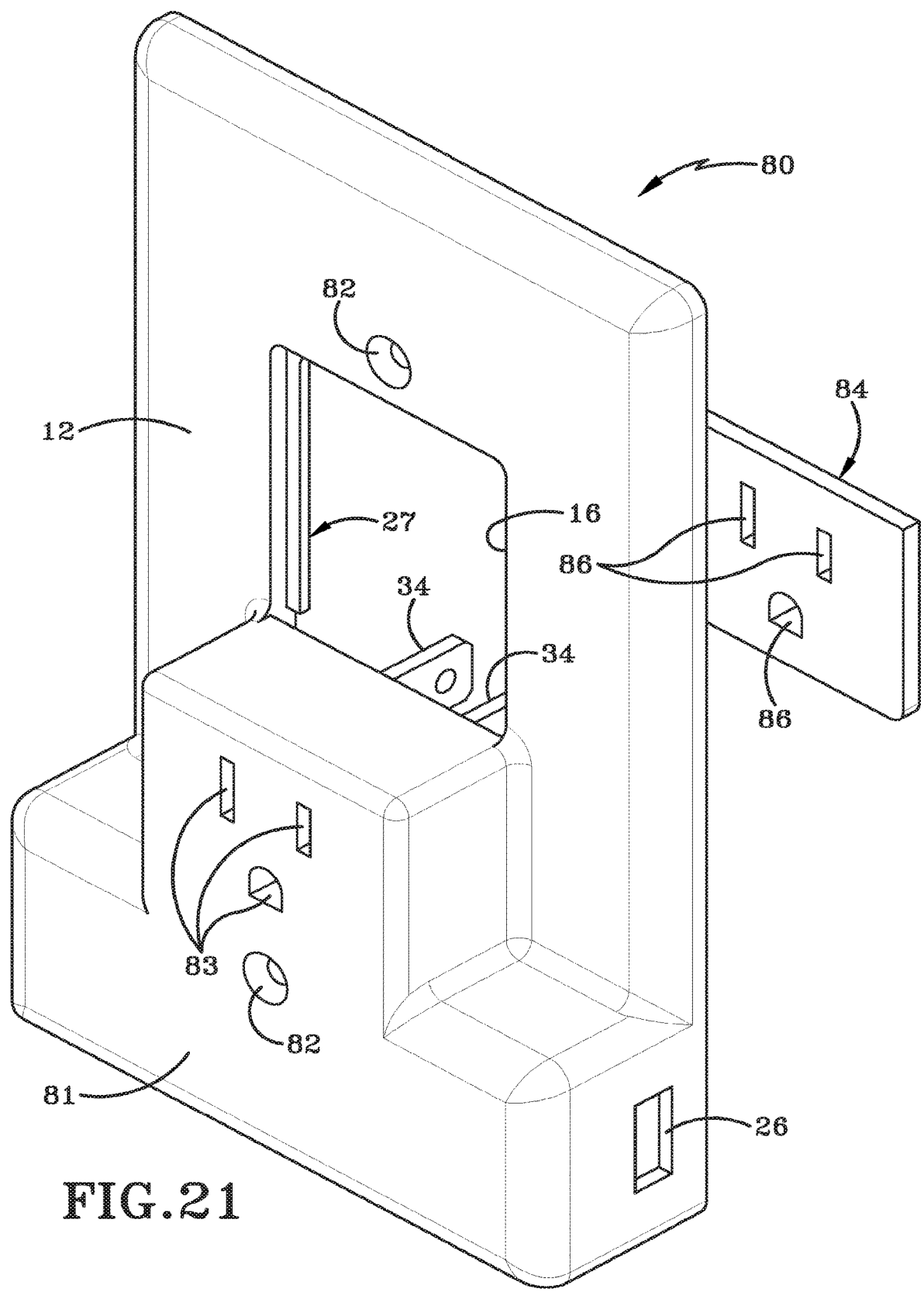
FIG. 21 is an exploded perspective view of the fifth embodiment powered wall plate.
Figure 22:
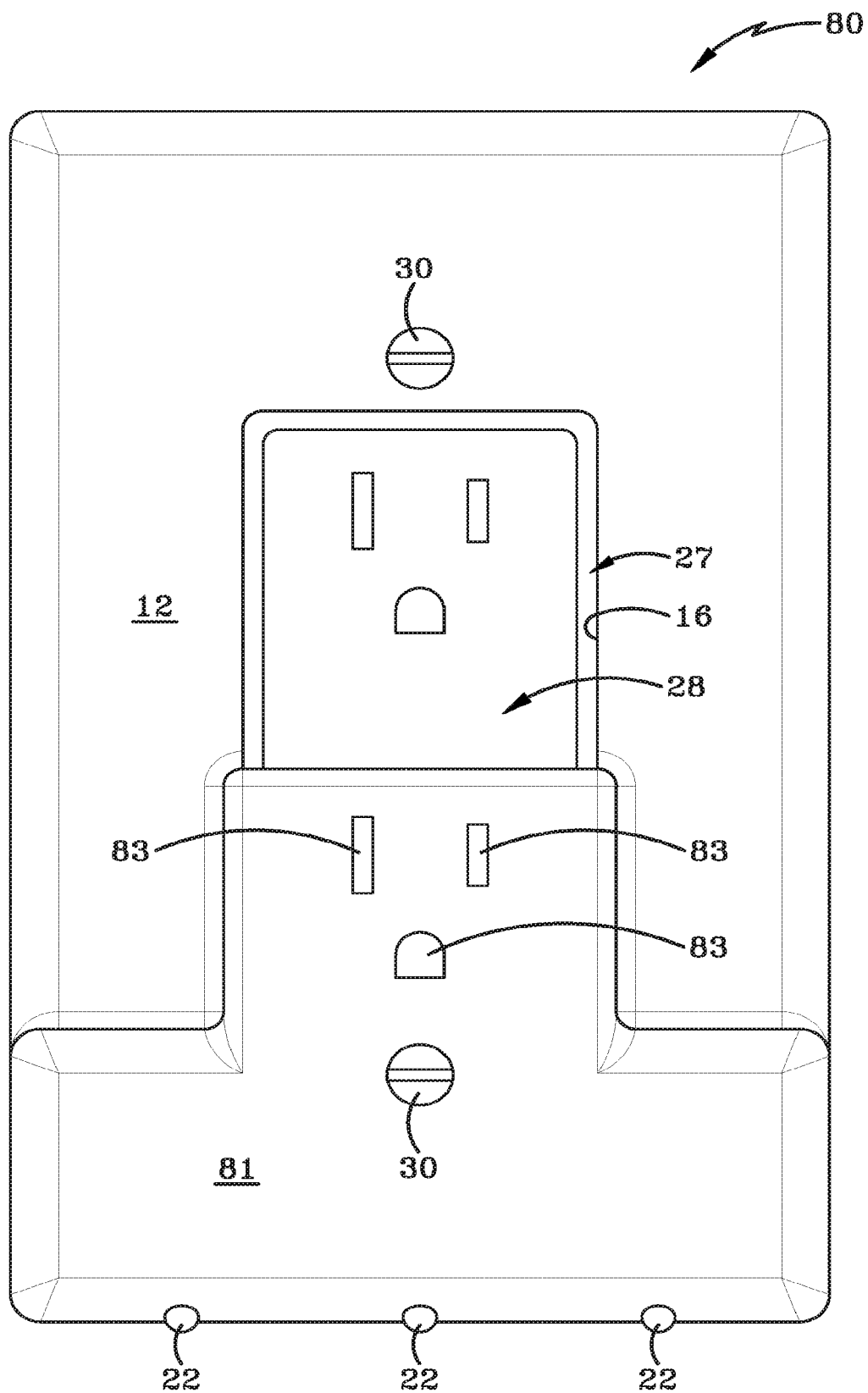
FIG. 22 is a front view of the fifth embodiment powered wall plate.

FIGS. 20-22 illustrate a fifth aspect powered wall plate 80 having a unitary construction. Specifically, powered wall plate 80 includes similar mounting screws 30 but also includes mounting apertures 82 and current apertures 83 on a front face 81. Front face 81 may protrude from the wall plate so that electrical contacts may be positioned therein and aligned with current apertures 83. In this manner, the entire wall plate 80 may be installed with prongs 34 within the electrical device 28 and secured using mounting screws 30 while leaving the upper electrical apertures open and providing additional electrical apertures on front face 81. Accordingly, the powered wall plate 80 can be easily installed with minimal effort.

Figure 23:
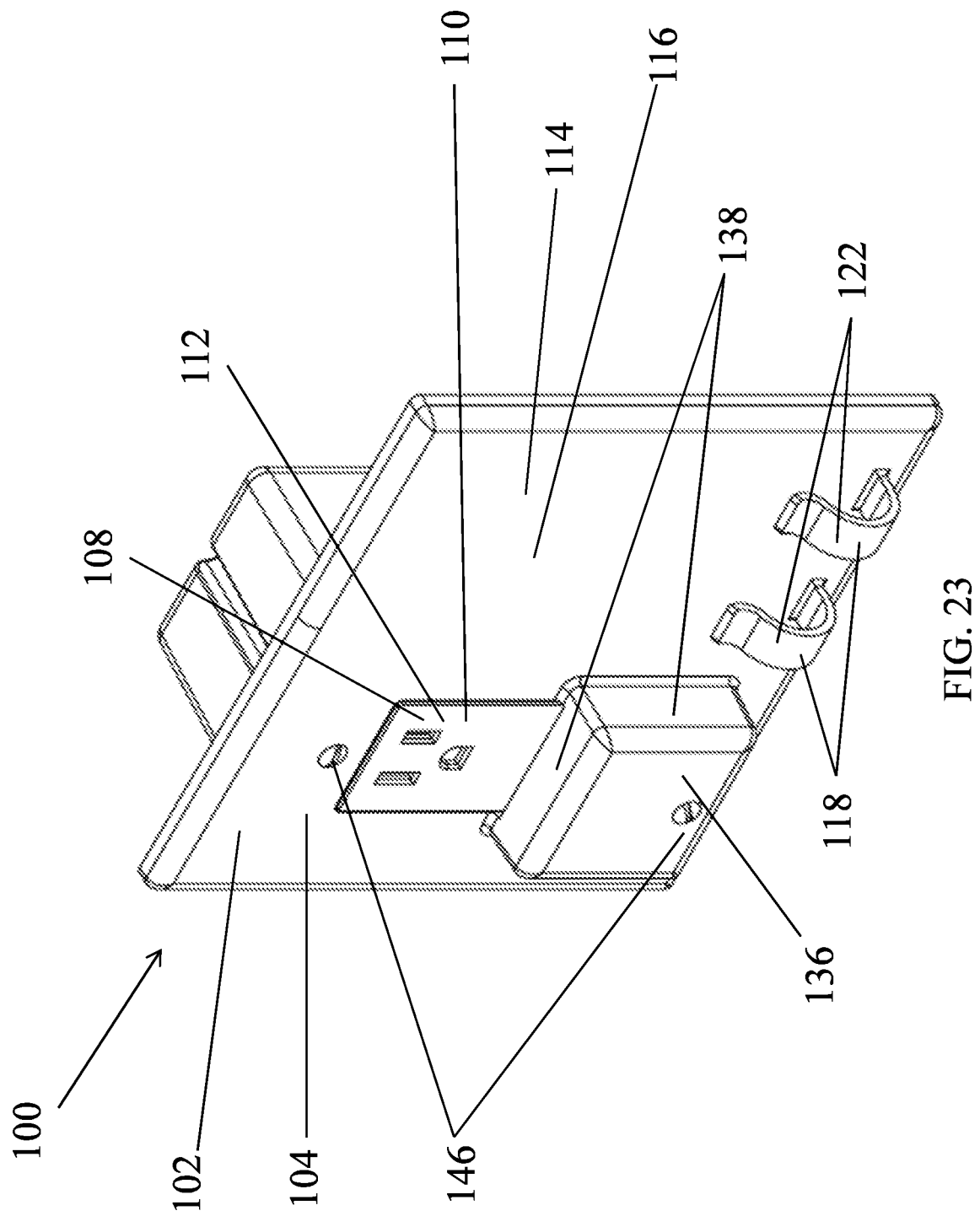
FIG. 23 is a perspective view of a sixth embodiment of the powered wall plate with an electrical device and electrical box attached.
Figure 24:
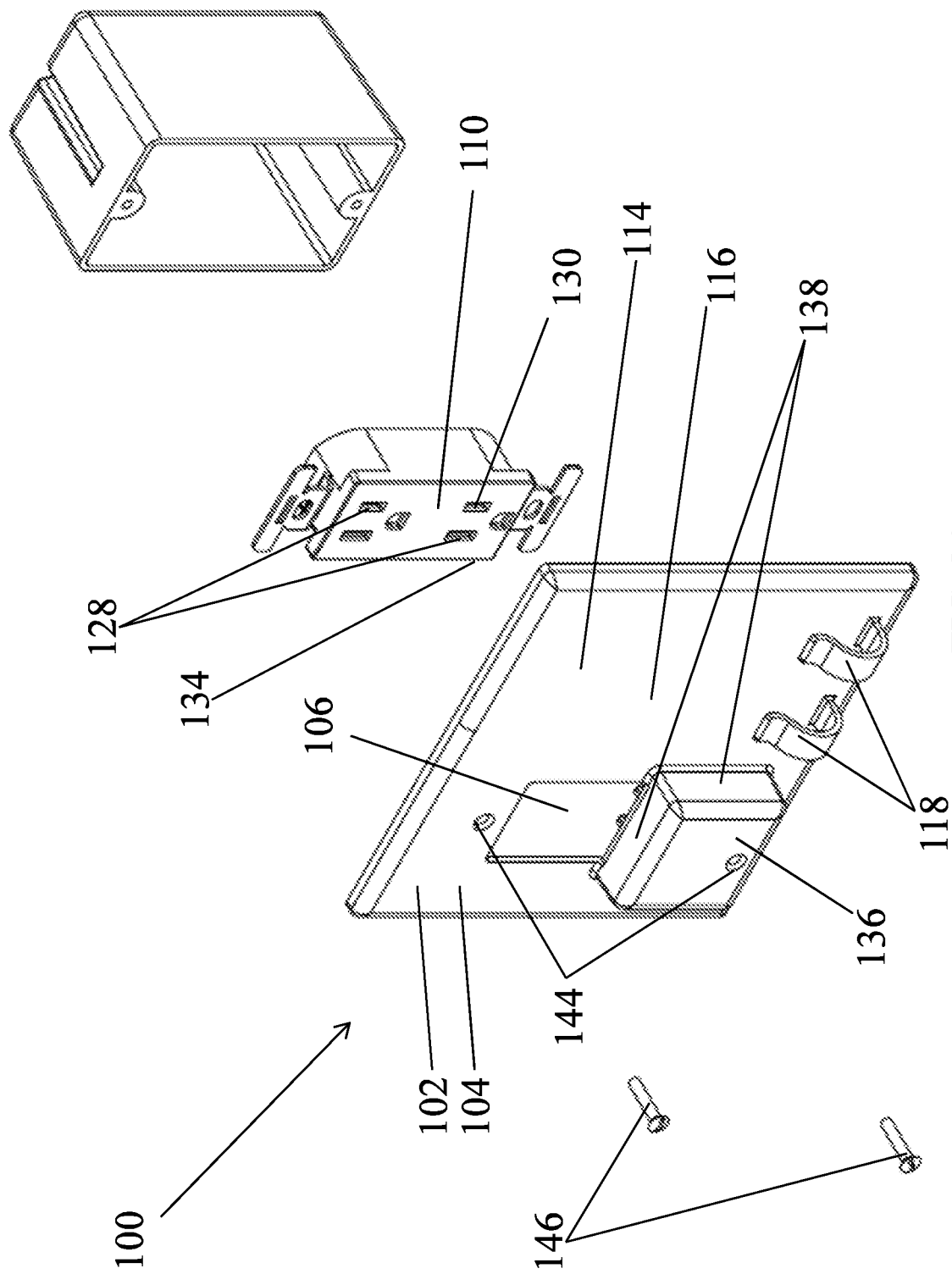
FIG. 24 is an exploded front perspective view of the sixth embodiment of the powered wall plate with an electrical device and electrical box.

FIGS. 23-33 illustrate a sixth embodiment, a powered wall plate 100. The powered wall plate 100 may be powered in the same way as disclosed in any of the above embodiments 1 through 5. As illustrated in FIGS. 23-24, the powered wall plate 100 has a wall plate 102 with a front surface 104 and an opening 106 extending therethrough. The opening 106 is sized to expose a portion 108 of an electrical device 110 behind the wall plate 102. The portion 108 may be a first half of the electrical device 110, a top half 112 of the electrical device 110, or any other section of the electrical device 110.

There may be a cell phone charging station 114 extending to the side of the wall plate 102. The cell phone charging station 114 has a cell phone charging plate 116 and a phone support 118. The cell phone charging plate 116 may be parallel and aligned with the front surface 104 and may be located adjacent to the opening 106. The cell phone charging plate 116 is configured to charge a phone 120 when the phone 120 is in a position near the charging plate 116. The phone support 118 extends forward from the front surface 104 below the charging plate 116 and is configured to support the phone 120 is the position near the charging plate 116. The phone support 118 may have at least two clips 122 that extend forward from the front surface 104 and curve toward the charging plate 116. The phone support 118 is useful to keep the phone 120 in the proper position for charging.

Figure 25:
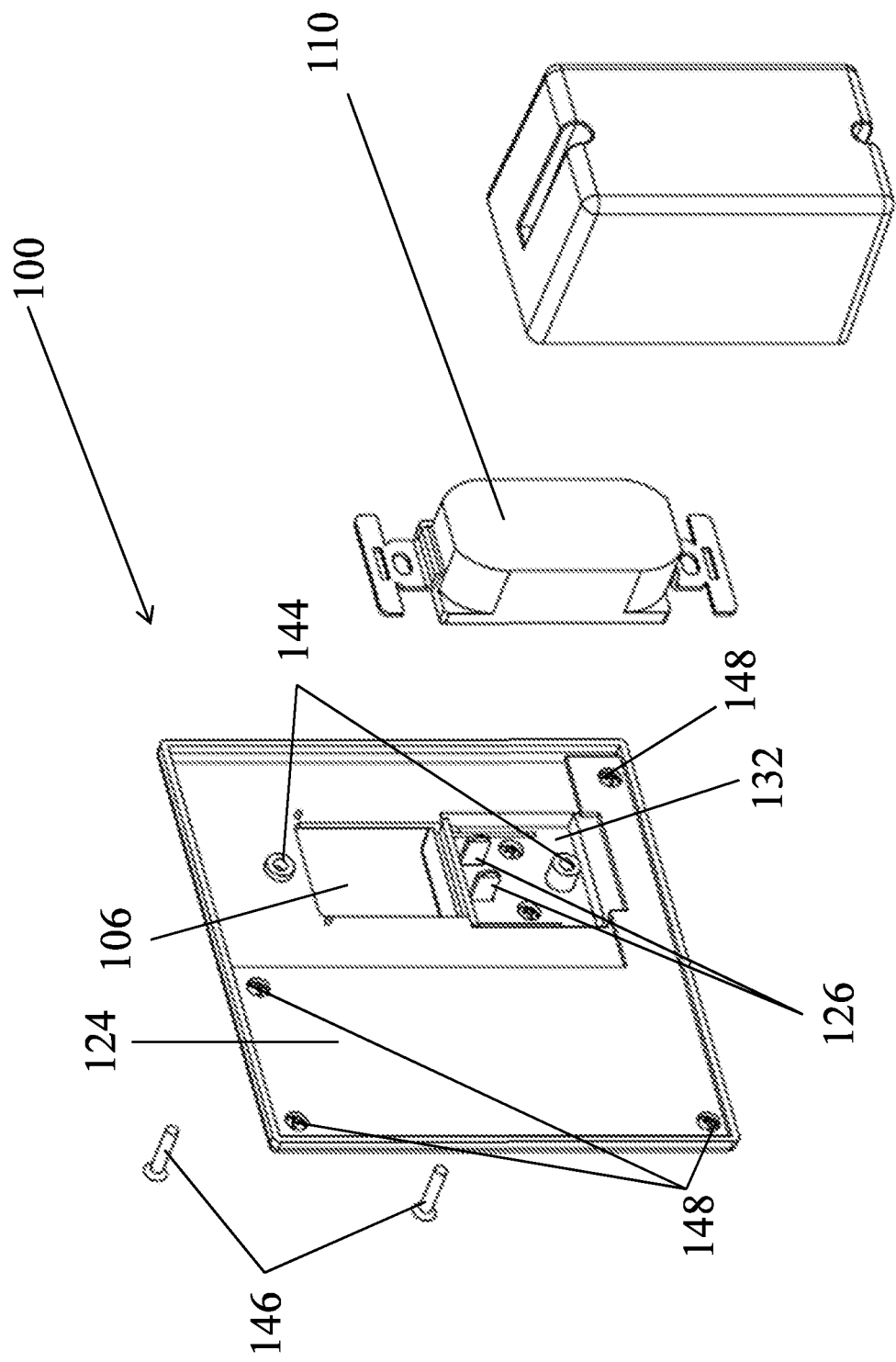
FIG. 25 is an exploded back perspective view of the sixth embodiment of the powered wall plate with an electrical device and electrical box.
Figure 26:
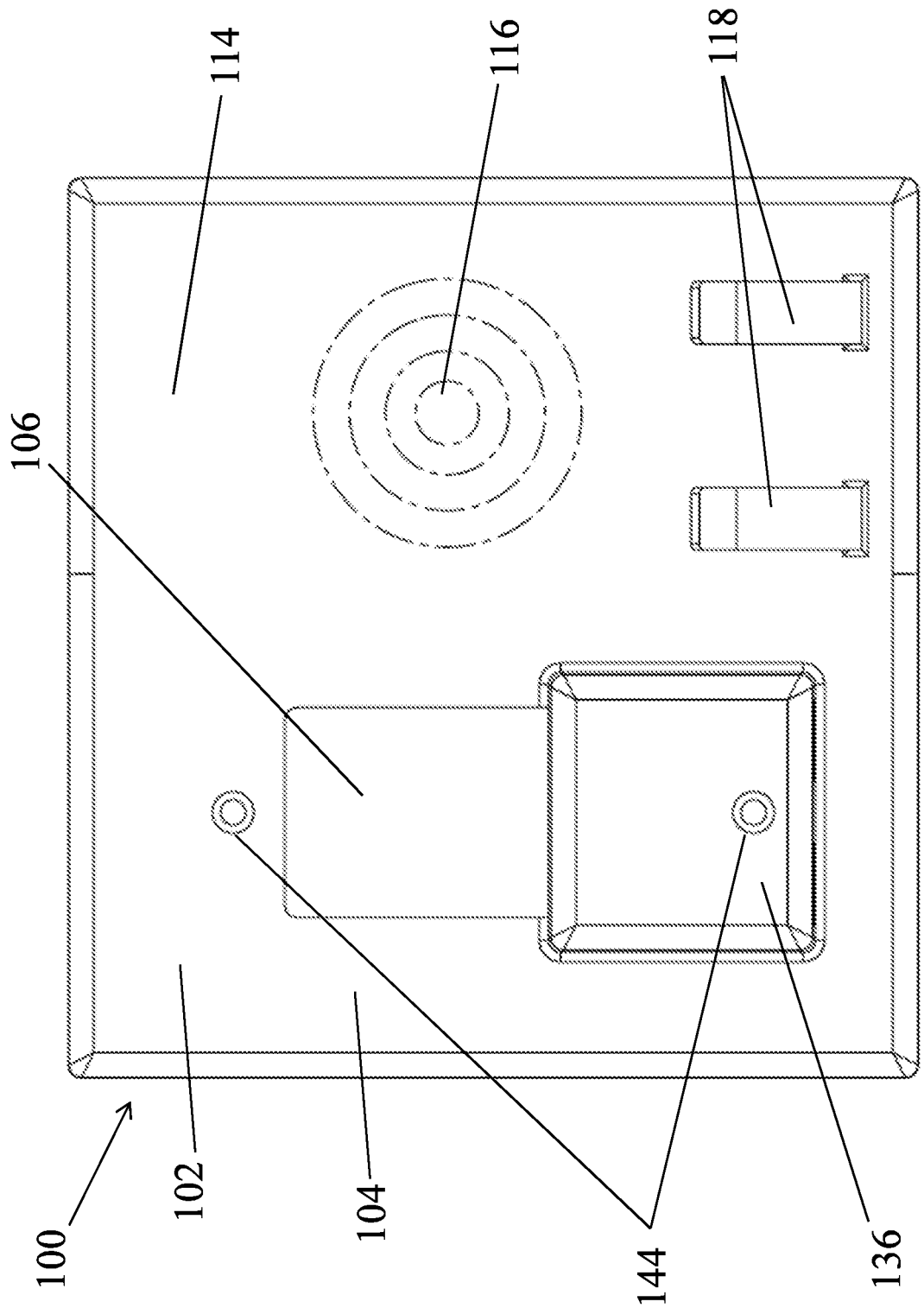
FIG. 26 is a front view of the sixth embodiment of the powered wall plate.
Figure 27:
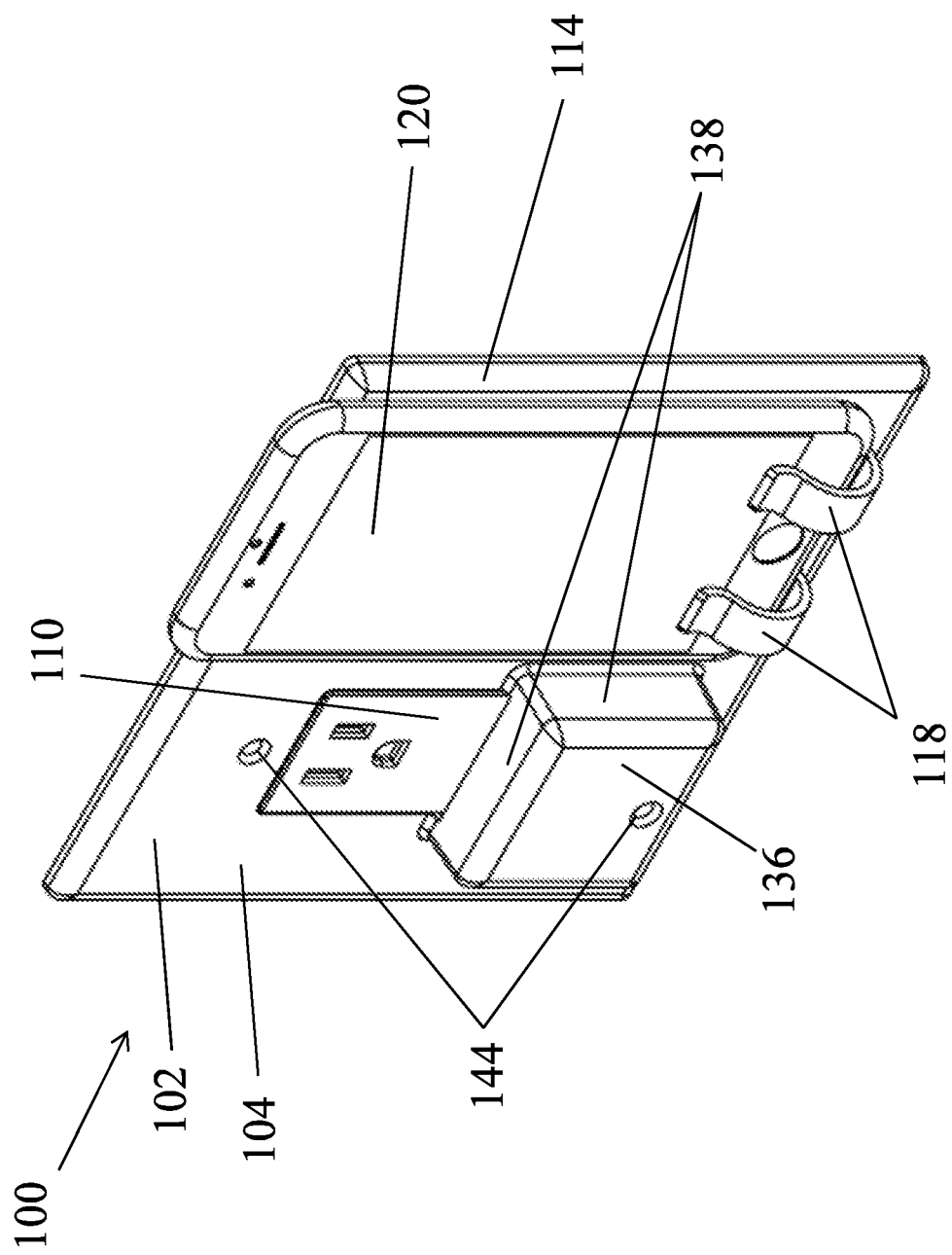
FIG. 27 is a perspective view of the sixth embodiment of the powered wall plate with a phone supported by the phone support.
Figure 28:
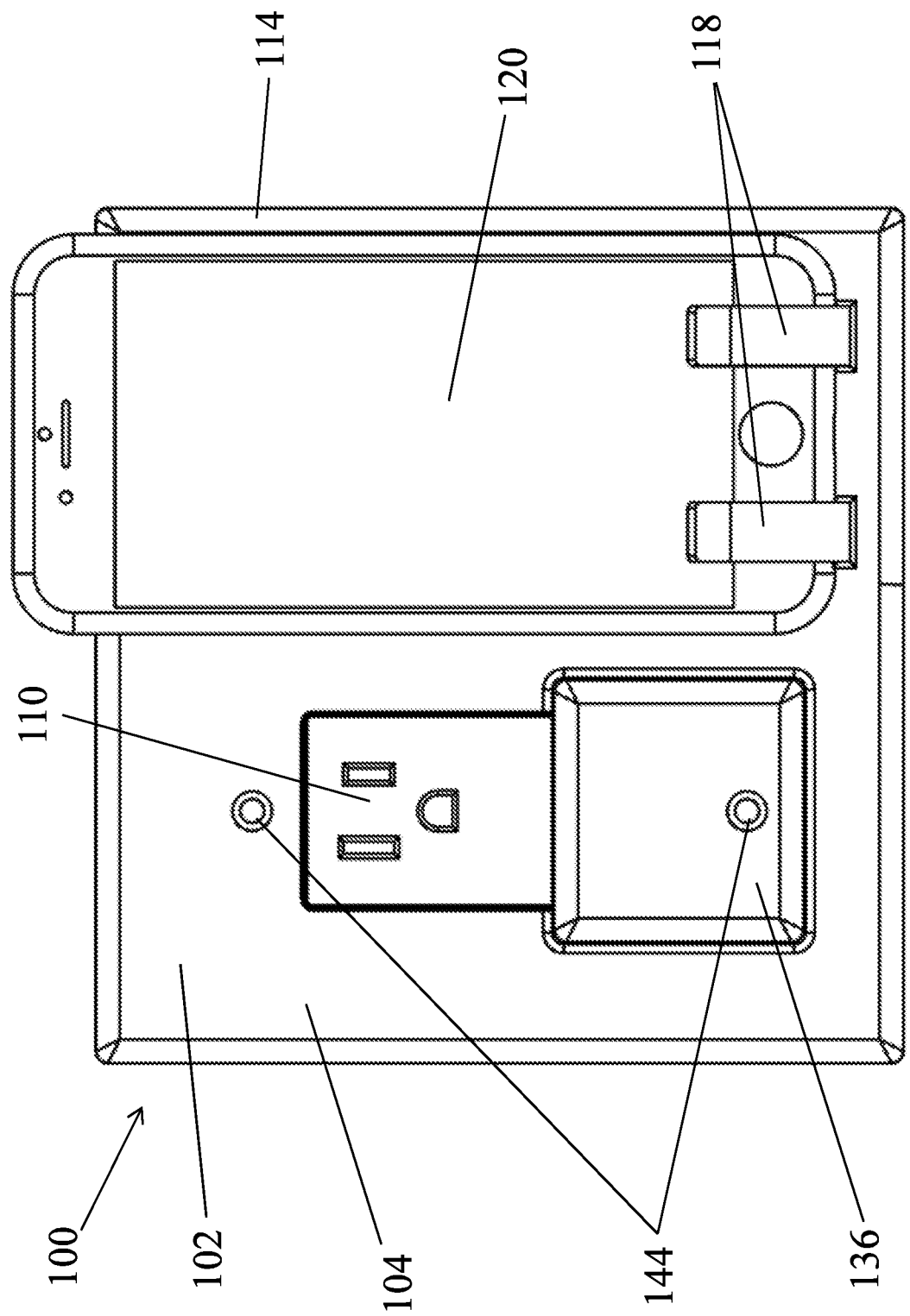
FIG. 28 is a front view of the sixth embodiment of the powered wall plate with a phone supported by the phone support.
Figure 29:
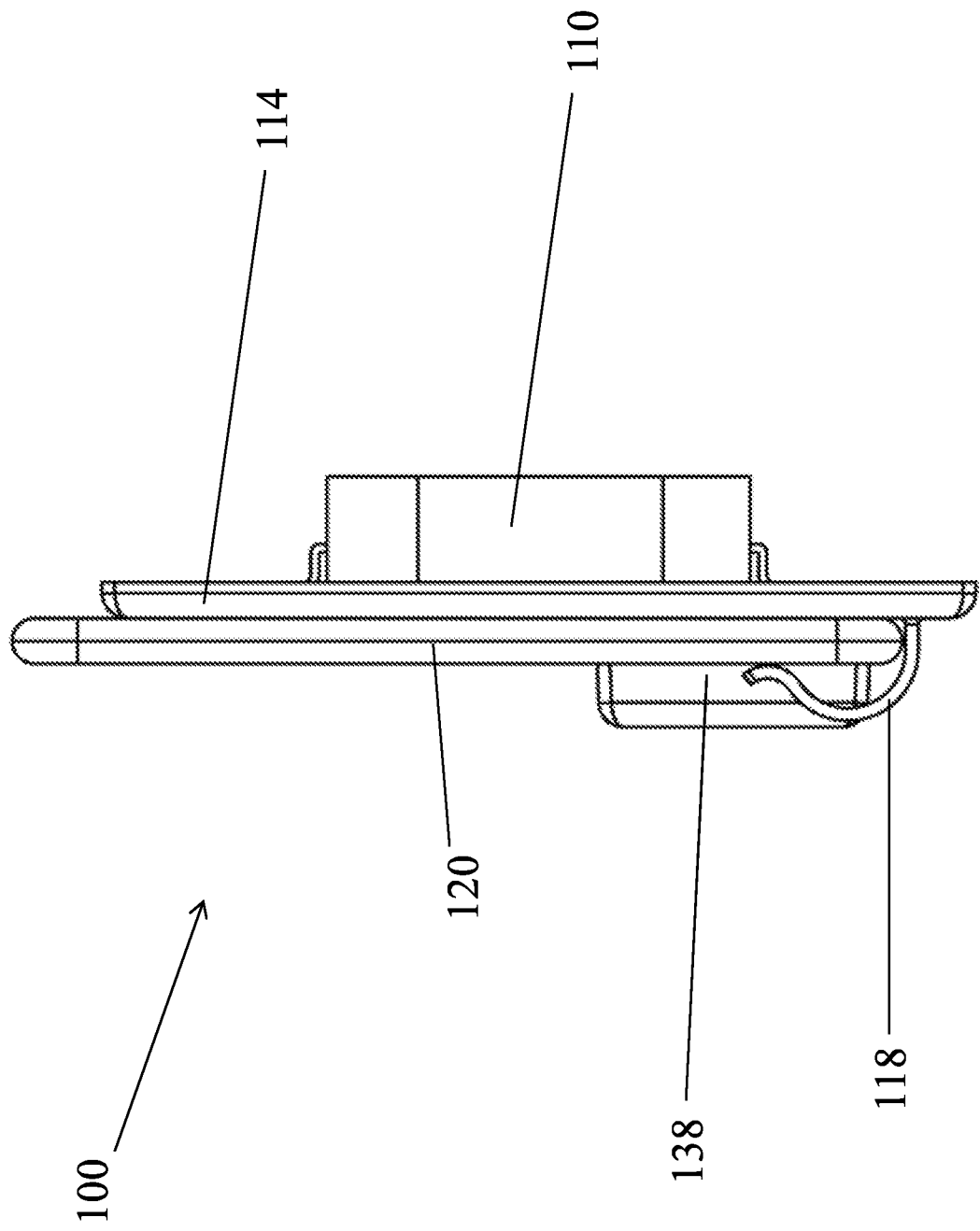
FIG. 29 is a side view of the sixth embodiment of the powered wall plate with a phone supported by the phone support.
Figure 30:
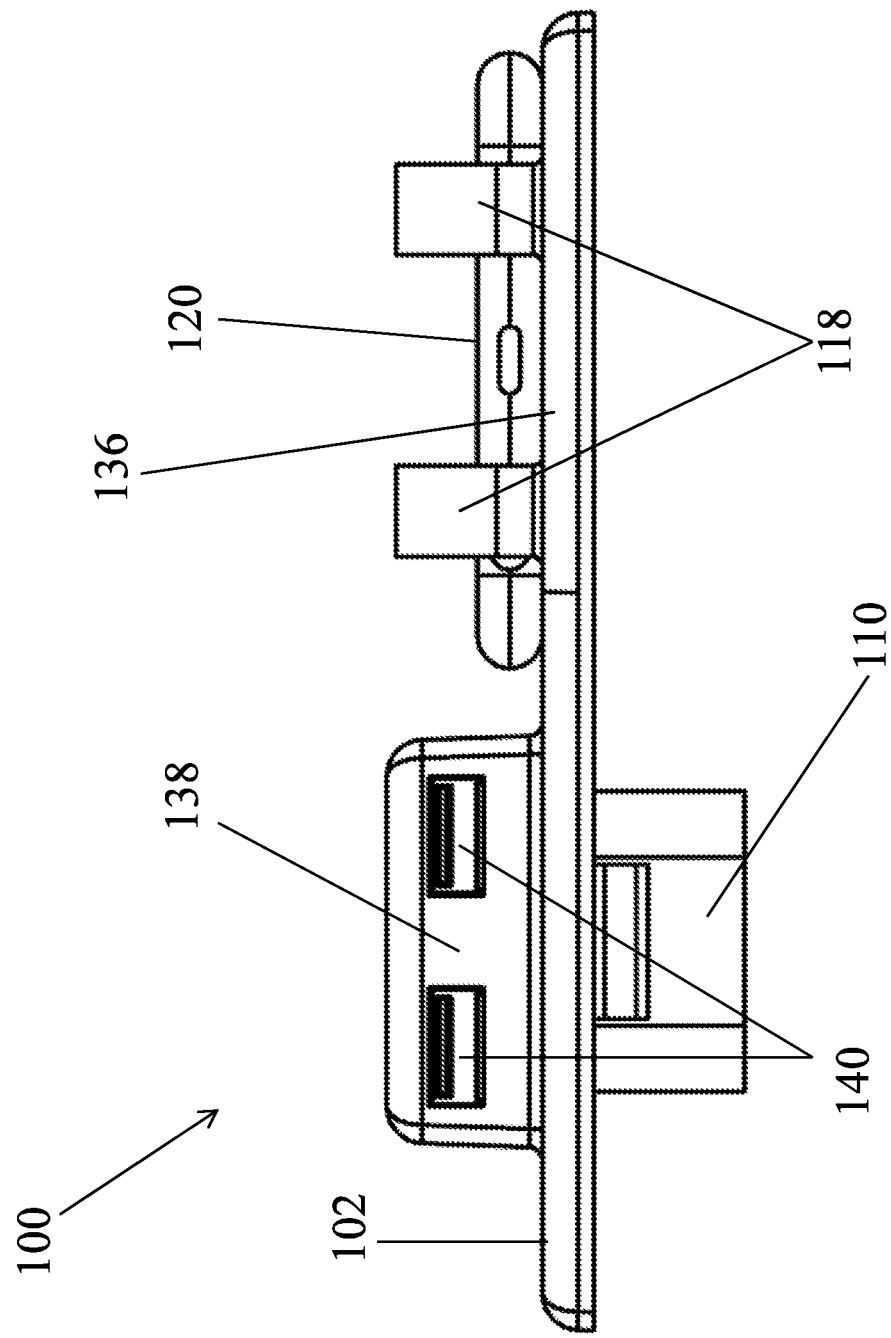
FIG. 30 is a bottom view of the sixth embodiment of the powered wall plate with a phone supported by the phone support.

As illustrated in FIG. 25, the wall plate 102 has a rear surface 124 opposite the front surface 104. At least two electrical plug prongs 126 originate within the wall plate 102 and extend rearward from the rear surface 124. The electrical plug prongs 126 are configured to removably mate with an electrical receptacle 128 located on a second half of the electrical device 110. The second half of the electrical device 110 may be the bottom half 130 of the electrical device 110 (see FIG. 24). The rear surface 124 surrounding the electrical plug prongs 126 may include a recess 132 which is sized to receive a face 134 of the electrical device 110 therein against the rear surface 124 within the recess 132.

Referring now to FIGS. 26-30, there may be a protruding front face 136 that extends forward from the front surface 102 and has multiple side surfaces 138. There may be at least one USB port 140 on any of the side surfaces 138 of the protruding front face 136 (see specifically FIG. 30). The at least one USB port 140 is electrically coupled to the electrical plug prongs 126 through an electrical circuit 142 located in between the front face 136 and the rear surface 124 (see FIG. 32). The electrical circuit 142 is configured to provide power to the at least one USB port 140 and the cell phone charging plate 116 when power is supplied to the electrical plug prongs 126. The powered wall plate 100 may also have a plurality of mounting screw apertures 144 extending through the wall plate 102. The mounting screw apertures 144 are configured to receive a plurality of mounting screws 146 to attach the wall plate 102 to the electrical device 110. One of the plurality of mounting screw apertures 144 may extend through the protruding front face 136.

In some implementations, the powered wall plate 100 is powered by inserting the at least two electrical plug prongs 126 into an electrical receptacle 128. Power thus flows through the at least two electrical plug prongs 126 into the electrical circuit 142 (see FIG. 32). The electrical circuit 142 is electrically coupled with the features of the powered wall plate 100 that require power to function, such as the at least one USB port 140 and the cell phone charging plate 116. Thus, each of the components of the powered wall plate 100 that function on power receive that power through the at least two electrical plug prongs 126 which mate with the electrical receptacle 128.

Figure 31:
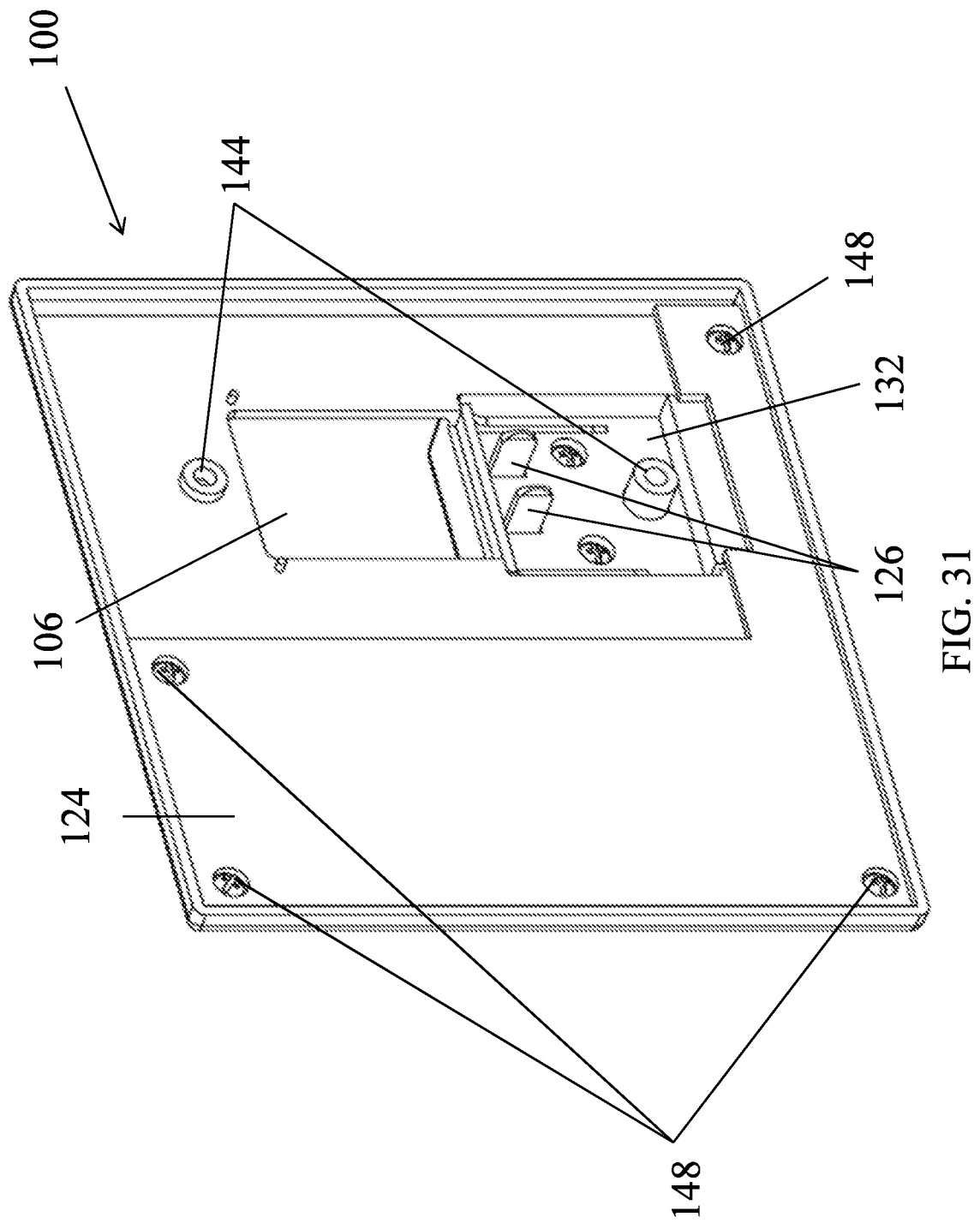
FIG. 31 is a back perspective view of the sixth embodiment of the powered wall plate.
Figure 32:
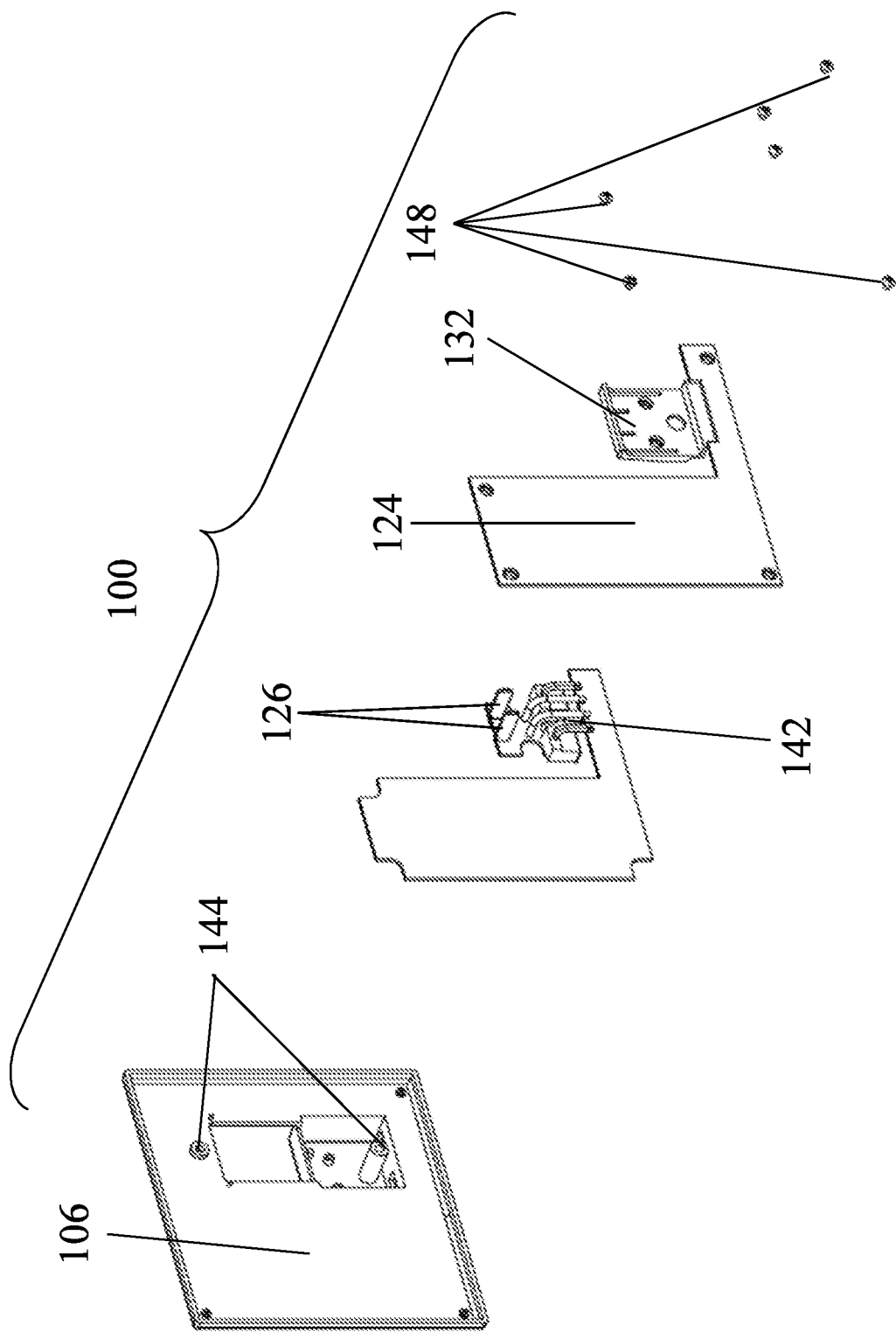
FIG. 32 is a back exploded perspective view of the sixth embodiment of the powered wall plate.

FIG. 31 illustrates a back perspective view of the powered wall plate 100, while FIG. 32 shows an exploded view. In the implementation shown, the powered wall plate 100 is held together by a plurality of wall plate screws 148. However, the powered wall plate could be assembled using any method known in the art, such as snaps or adhesive, or the powered wall plate could simply snap together.

Figure 33:
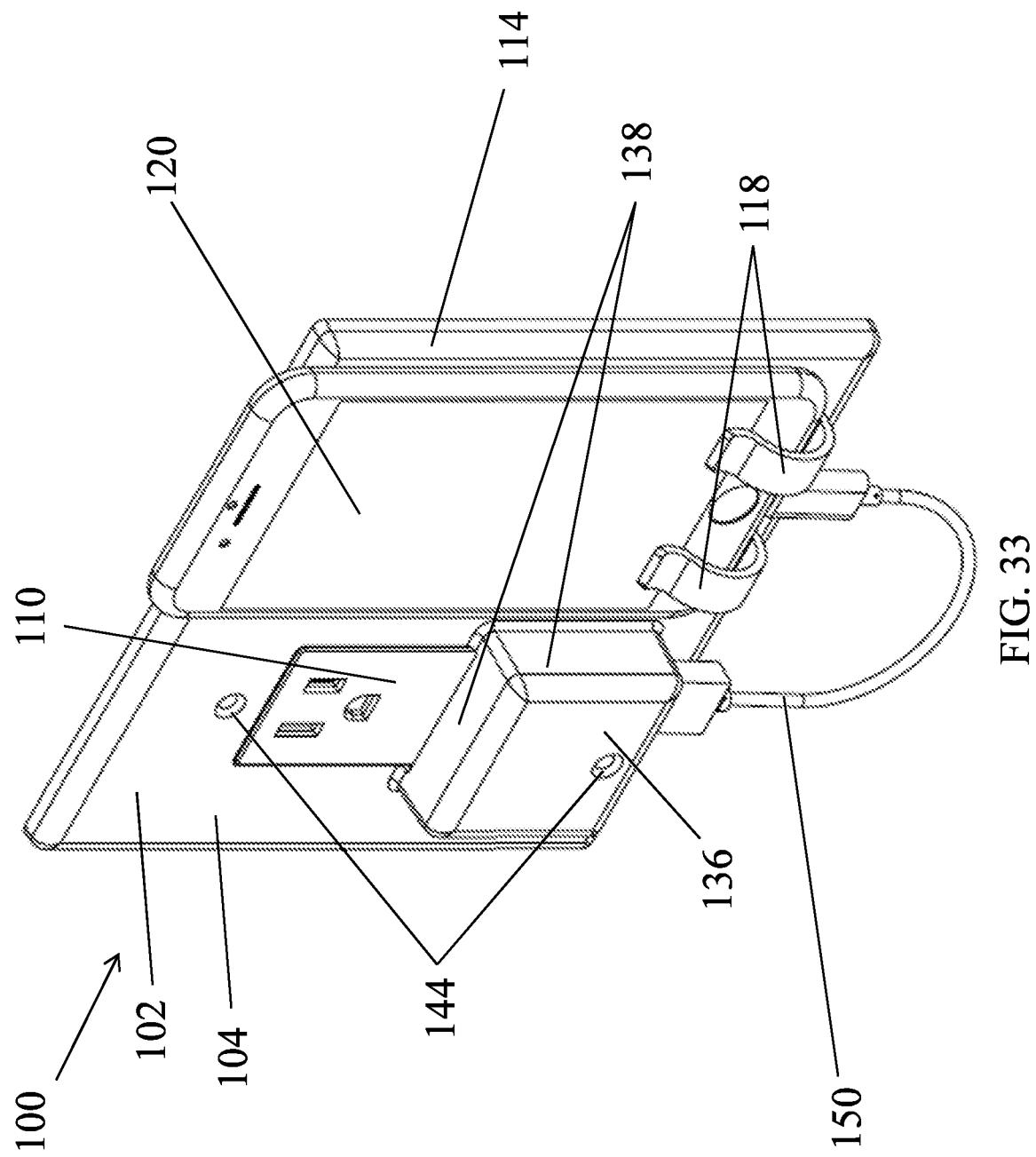
FIG. 33 is a front perspective view of the sixth embodiment of the powered wall plate with a phone supported by the phone support and a charging cord connecting the phone to the USB port.

FIG. 33 illustrates that the powered wall plate 100 may be used with a charging cord 150. The charging cord 150 may be coupled with the USB port 140 on one end and with the phone 120 on the other to provide power to the phone 120.

The powered wall plate 100 provides a convenient location to place a cell phone 120 when the cell phone 120 is charging or otherwise not in use. This can help save on counter space as well. The powered wall plate 100 is easily installed by plugging the electrical plug prongs 126 into the electrical device 110 and then inserting the plurality of mounting screws 146 through the plurality of mounting screw apertures 144 to secure the powered wall plate 100 to the electrical device 110.

It will be understood that implementations are not limited to the specific components disclosed herein, as virtually any components consistent with the intended operation of a method and/or system implementation for a powered wall plate may be utilized. Components may comprise any shape, size, style, type, model, version, class, grade, measurement, concentration, material, weight, quantity, and/or the like consistent with the intended operation of a method and/or system implementation for a powered wall plate.

The concepts disclosed herein are not limited to the specific implementations shown herein. For example, it is specifically contemplated that the components included in a particular implementation of a powered wall plate may be formed of any of many different types of materials or combinations that can readily be formed into shaped objects and that are consistent with the intended operation of a powered wall plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the powered wall plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a powered wall plate, it should be readily apparent that a number of modifications may be made without departing from the spirit thereof and that these implementations may be applied to other powered wall plate. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. A powered wall plate comprising:
   a wall plate having a front surface opposite a rear surface and at least one opening extending through the front surface and the rear surface that is sized to expose at least a first half of an electrical device therethrough;
   at least two electrical plug prongs originating within the wall plate and extending rearward from the rear surface, the at least two electrical plug prongs configured to removably mate with an electrical receptacle located on a second half of the electrical device, the rear surface surrounding the at least two electrical plug prongs including a recess, the recess sized to receive a face of the electrical device therein against the rear surface within the recess;
   a protruding front face extending from the front surface;
   a plurality of mounting screw apertures extending through the wall plate and configured to receive a plurality of mounting screws to attach the wall plate to the electrical device, wherein at least one of the plurality of mounting screw apertures extends through the protruding front face;
   a cell phone charging station extending to a side of the wall plate, the charging station comprising:
      a cell phone charging plate parallel and aligned with the front surface of the wall plate and adjacent to the opening, the charging plate configured to charge a phone when the phone is in a position near the charging plate; and
      a phone support extending forward from the front surface below the charging plate, the phone support configured to hold the phone in the position near the charging plate; and
   at least one USB port exposed on a side surface of the protruding front face and electrically coupled to the electrical plug prongs through an electrical circuit located in between the front face and the rear surface;
   wherein the circuit is configured to provide power to the at least one USB port and the cell phone charging plate when power is supplied to the at least two electrical plug prongs.

2. The powered wall plate of claim 1, wherein the first half of the electrical device is a top half of the electrical device.

3. The powered wall plate of claim 1, wherein the second half of the electrical device is a bottom half of the electrical device.

4. The powered wall plate of claim 1, wherein the phone support has at least two clips extending forward from the front surface and curving toward the charging plate.

5. A powered wall plate comprising:
- a wall plate having a front surface opposite a rear surface and at least one opening extending through the front surface and the rear surface that is sized to expose a first half of an electrical device therethrough;
- at least two electrical plug prongs originating within the wall plate and extending rearward from the rear surface, the at least two electrical plug prongs configured to removably mate with an electrical receptacle located on a second half of the electrical device;
- a plurality of mounting screw apertures extending through the wall plate and configured to receive a plurality of mounting screws to attach the wall plate to the electrical device; and
- a cell phone charging station extending to a side of the wall plate, the charging station comprising:
  - a cell phone charging plate parallel and aligned with the front surface of the wall plate and adjacent to the opening, the charging plate configured to charge a phone when the phone is in a position near the charging plate; and
  - a phone support extending forward from the front surface below the charging plate, the phone support configured to hold the phone in the position near the charging plate.

6. The powered wall plate of claim 5, the rear surface surrounding the at least two electrical plug prongs including a recess, the recess sized to receive a face of the electrical device therein against the rear surface within the recess.

7. The powered wall plate of claim 5, further comprising a protruding front face extending from the front surface, wherein at least one of the plurality of mounting screw apertures extends through the protruding front face.

8. The powered wall plate of claim 7, further comprising at least one USB port exposed on a side surface of the protruding front face and electrically coupled to the electrical plug prongs through an electrical circuit located in between the front face and the rear surface.

9. The powered wall plate of claim 8, wherein the circuit is configured to provide power to the at least one USB port and the cell phone charging plate when power is supplied to the at least two electrical plug prongs.

10. A powered wall plate comprising:
- a wall plate having a front surface opposite a rear surface and at least one opening extending through the front surface and the rear surface that is sized to expose a portion of an electrical device therethrough;
- at least two electrical plug prongs originating within the wall plate and extending rearward from the rear surface, the at least two electrical plug prongs configured to removably mate with an electrical receptacle of the electrical device; and
- a cell phone charging station extending to a side of the wall plate, the charging station comprising:
  - a cell phone charging plate parallel and aligned with the front surface of the wall plate and adjacent to the opening, the charging plate configured to charge a phone when the phone is in a position near the charging plate; and
  - a phone support positioned below the charging plate, the phone support configured to hold the phone in the position near the charging plate.

11. The powered wall plate of claim 10, wherein the exposed portion of the electrical device is a first half of the electrical device.

12. The powered wall plate of claim 11, wherein the first half of the electrical device is a top half of the electrical device.

13. The powered wall plate of claim 10, further comprising a protruding front face extending from the front surface.

14. The powered wall plate of claim 13, further comprising at least one USB port exposed on a side surface of the protruding front face and electrically coupled to the electrical plug prongs through an electrical circuit located in between the front face and the rear surface.

15. The powered wall plate of claim 14, wherein the circuit is configured to provide power to the at least one USB port and the cell phone charging plate when power is supplied to the at least two electrical plug prongs.

16. The powered wall plate of claim 13, further comprising a plurality of mounting screw apertures extending through the wall plate and configured to receive a plurality of mounting screws to attach the wall plate to the electrical device.

17. The powered wall plate of claim 16, wherein at least one of the plurality of mounting screw apertures extends through the protruding front face.

18. The powered wall plate of claim 10, wherein the phone support has at least two clips extending forward from the front surface and curving toward the charging plate.

19. The powered wall plate of claim 10, the rear surface surrounding the at least two electrical plug prongs including a recess, the recess sized to receive a face of the electrical device therein against the rear surface within the recess.

* * * * *